(12) United States Patent
Yamada et al.

(10) Patent No.: US 6,302,819 B1
(45) Date of Patent: Oct. 16, 2001

(54) INFINITE SPEED RATIO TRANSMISSION DEVICE

(75) Inventors: Kazuhiro Yamada, Miura; Hirofumi Shimizu, Yokosuka, both of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/492,365

(22) Filed: Jan. 27, 2000

(30) Foreign Application Priority Data

Jan. 27, 1999 (JP) .................................................. 11-018260

(51) Int. Cl.$^7$ .................................................. F16H 37/02
(52) U.S. Cl. ........................... 475/214; 475/216; 476/10; 476/42
(58) Field of Search ...................... 475/214, 215, 475/216, 218, 183, 192; 476/10, 40, 41

(56) References Cited

U.S. PATENT DOCUMENTS

| | | | |
|---|---|---|---|
| 5,807,203 | * | 9/1998 | Imanishi et al. ........................ 476/42 |
| 5,935,039 | | 8/1999 | Sakai et al. ............................ 476/10 |

FOREIGN PATENT DOCUMENTS 10-220551    8/1998 (JP) .

\* cited by examiner

*Primary Examiner*—Sherry Estremsky
*Assistant Examiner*—Tisha D. Lewis
(74) *Attorney, Agent, or Firm*—Foley & Lardner

(57) ABSTRACT

In an infinite speed ratio transmission device comprising a continuously variable transmission (2), fixed speed ratio transmission (3) and planetary gear set (5), a final output shaft (6) is provided to extract the rotation output of the planetary gear mechanism (5). The output gear (3B), a sprocket (4A) and transmission device output gear (7) are formed on a final output shaft (6). The output gear (3B) engages with an input gear (3A) of the fixed speed ratio transmission (3), and the device output gear (7) engages with the final gear (12). The output of the continuously variable transmission (2) is transmitted to the sprocket (4A) via a chain (40). Of the gear set of the input gear (3A) and output gear (3B) and the gear set of the device output gear (7) and final gear (12), one set comprises helical gears having helical tooth traces. The orientation of the tooth traces is set so that the moment exerted by the rotating helical gears on the final output shaft (6) suppresses the bending stress in the final output shaft (6) due to the tension of the chain (40).

10 Claims, 20 Drawing Sheets

INFINITE SPEED RATIO TRANSMISSION DEVICE

FIELD OF THE INVENTION

This invention relates to helical gears used for infinite speed ratio transmission device for vehicles.

BACKGROUND OF THE INVENTION

U.S. Pat. No. 5,935,039 and Tokkai Hei 10-220551 published by the Japanese Patent Office in 1998 disclose an infinite speed ratio transmission device for a vehicle wherein a fixed speed ratio transmission and a planetary gear set are combined with a toroidal continuously variable transmission (CVT) in order to increase the speed ratio range of the CVT. In this device, an engine output is input into the CVT and the fixed speed ratio transmission.

The output shaft of the CVT is combined with a sun gear of the planetary gear set, and the output shaft of the fixed speed ratio transmission is combined with a planet carrier of the planetary gear set via a power circulation clutch.

A ring gear of the planetary gear set is joined to a final output shaft of the transmission device which drives the wheels. The output shaft of CVT is also joined to the final output shaft of the transmission via a direct clutch.

SUMMARY OF THE INVENTION

In order to prevent noise and mechanical vibration in the fixed speed ratio transmission and the transmission device output gear of such a transmission device, a helical gear is generally used. Some of these helical gears are fixed to the final output shaft. The helical gears generate a thrust force in a gripping part according to the direction of the helix, and the direction of torque transmission.

On the other hand, when the CVT and sun gear are joined together via a chain, the tension of the chain exerts a force in a perpendicular direction to the final output shaft of the transmission device.

Due to the thrust forces acting on the helical gears, and the perpendicular force exerted by the chain, the final output shaft tends to bend. If the final output shaft bends, the durability of the bearing which supports the final output shaft will decrease, and the power transmission efficiency will fall due to the increase of friction in the bearing.

It is therefore an object of this invention to alleviate the bending of the final output shaft of an infinite speed ratio transmission device.

In order to achieve the above object, this invention provides an infinite speed ratio transmission device for a vehicle, The device comprises an input shaft, a final output shaft, a continuously variable transmission having a first sprocket and transmitting a rotation of the input shaft to the first sprocket at an arbitrary speed ratio, a fixed speed ratio transmission comprising an output gear formed on the final output shaft and an input gear which inputs the rotation of the input shaft and which is meshed with the output gear, a second sprocket formed on the final output shaft, a chain which transmits the rotation of the first sprocket to the second sprocket, a device output gear formed on the final output shaft, a final gear meshed with the device output gear, and a planetary gear set which causes the final output gear to rotate according to the relative rotation of the second sprocket and the output gear.

Either one of a gear set of the input gear and the output gear, or a gear set of the device output gear and the final gear, comprises helical gears having a slanting tooth trace, which, when rotating, exerts a moment on the final output shaft in a direction to suppress a bending stress in the final output shaft due to a tension of the chain.

The details as well as other features and advantages of this invention are set forth in the remainder of the specification and are shown in the accompanying drawings.

DESCRIPTION OF THE PREFERRED EMBODIMENTS

Figure 1:
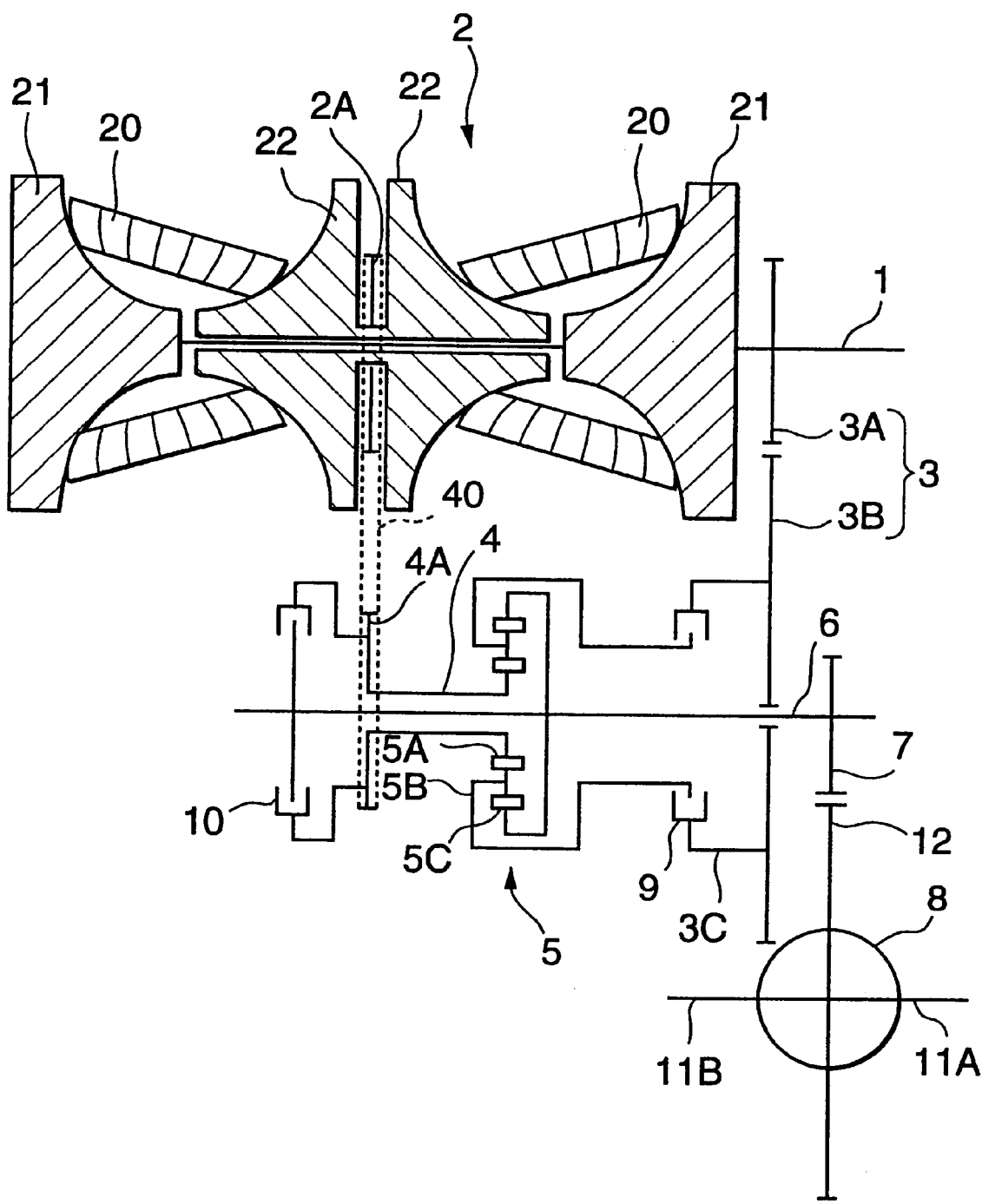
FIG. 1 is a schematic diagram of an infinite speed ratio transmission device according to this invention.

Referring to FIG. 1 of the drawings, an infinite speed ratio transmission device for vehicles is equipped with an input shaft 1, toroidal continuously variable transmission (CVT) 2, fixed speed ratio transmission 3, planetary gear set 5 and final output shaft 6. The CVT 2 is equipped with two pairs of input disks 21 and output disks 22.

A pair of power rollers 20 are gripped by the input disk 21 and the output disk 22 of each pair. The input disks 21 are joined to an input shaft 1. The input shaft 1 is joined to the output shaft of the engine, not shown. The rotation of the output disks 22 is transmitted to a CVT output shaft 4 via a sprocket 2A, chain 4B and sprocket 4A.

The CVT output shaft 4 is joined to a sun gear 5A of the planetary gear set 5. It is also joined to the final output shaft 6 via a direct clutch 10.

The fixed speed ratio transmission 3 is equipped with an input gear 3A which rotates together with the input shaft 1, output gear 3B, and gear output shaft 3C.

The input gear 3A is meshed with the output gear 3B, and the output gear 3B is joined to the gear output shaft 3C.

The gear output shaft 3C is joined to a planet carrier 5B carrying planet gears of the planetary gear set 5 via a power circulation clutch 9. A ring gear 5C of the planetary gear set 5 is joined to the final output shaft 6.

The rotation of the final output shaft 6 is transmitted to the drive wheel shafts 11A, 11B of the vehicle via a device output gear 7, final gear 12 and differential 8.

In this infinite speed ratio transmission device, the drive wheel shafts 11A, 11B are driven by two kinds of power transmission mode, i.e., a power circulation mode wherein the power circulation clutch 9 is engaged and the direct clutch 10 is released, and a direct mode wherein the power circulation clutch 9 is released and the direct clutch 10 is engaged.

In the power circulation mode, the rotation speed of the final output shaft 6 is continuously varied from a negative value to a positive value according to a difference of the speed ratios of the CVT 2 and the fixed speed ratio transmission 3.

Figure 2:
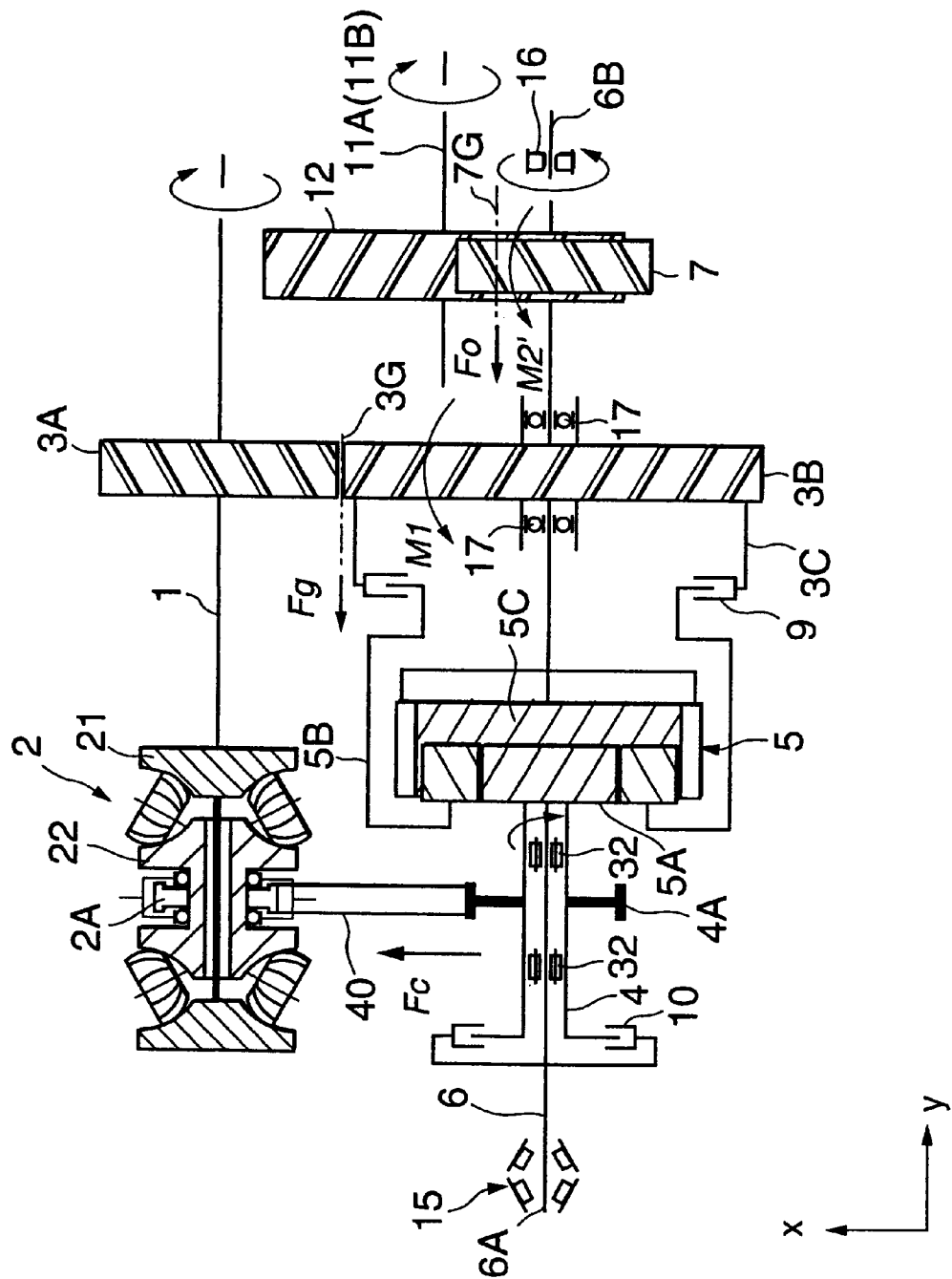
FIG. 2 is a schematic diagram of the infinite speed ratio transmission device describing a tooth trace of helical gears and a thrust force according to this invention.

Referring to FIG. 2, one end 6A of the final output shaft 6 is supported by an angular bearing 15, and another end 6B is supported by a radial bearing 16.

The direct mode clutch 10, CVT output shaft 4 joined to the sprocket 4A, planetary gear mechanism 5, power circulation mode clutch 9, output shaft 3C and output gear 3B of the fixed speed ratio transmission 3, and the device output gear 7, are joined to the final output shaft 6 between the angular bearing 15 and radial bearing 16.

The CVT output shaft 4 comprises a hollow shaft of which the outer circumference is joined to the inner circumference of the sprocket 4A.

One end of the CVT output shaft 4 is joined to the sun gear 5A, and the other end is joined to the direct clutch 10.

The CVT output shaft 4 rotates relatively to the final output shaft 6 via plural bearings 32 disposed on the inner circumference. The output shaft 3C of the fixed speed ratio transmission 3 is formed in the shape of a hollow shaft and the final output shaft 6 penetrates inside.

The output gear 3B fixed to output shaft 3C is supported by the final output shaft 6 via a pair of bearings 17.

The input gear 3A of the fixed transmission 3, output gear 3B, device output gear 7 and final gear 12 are helical gears.

Figure 3:
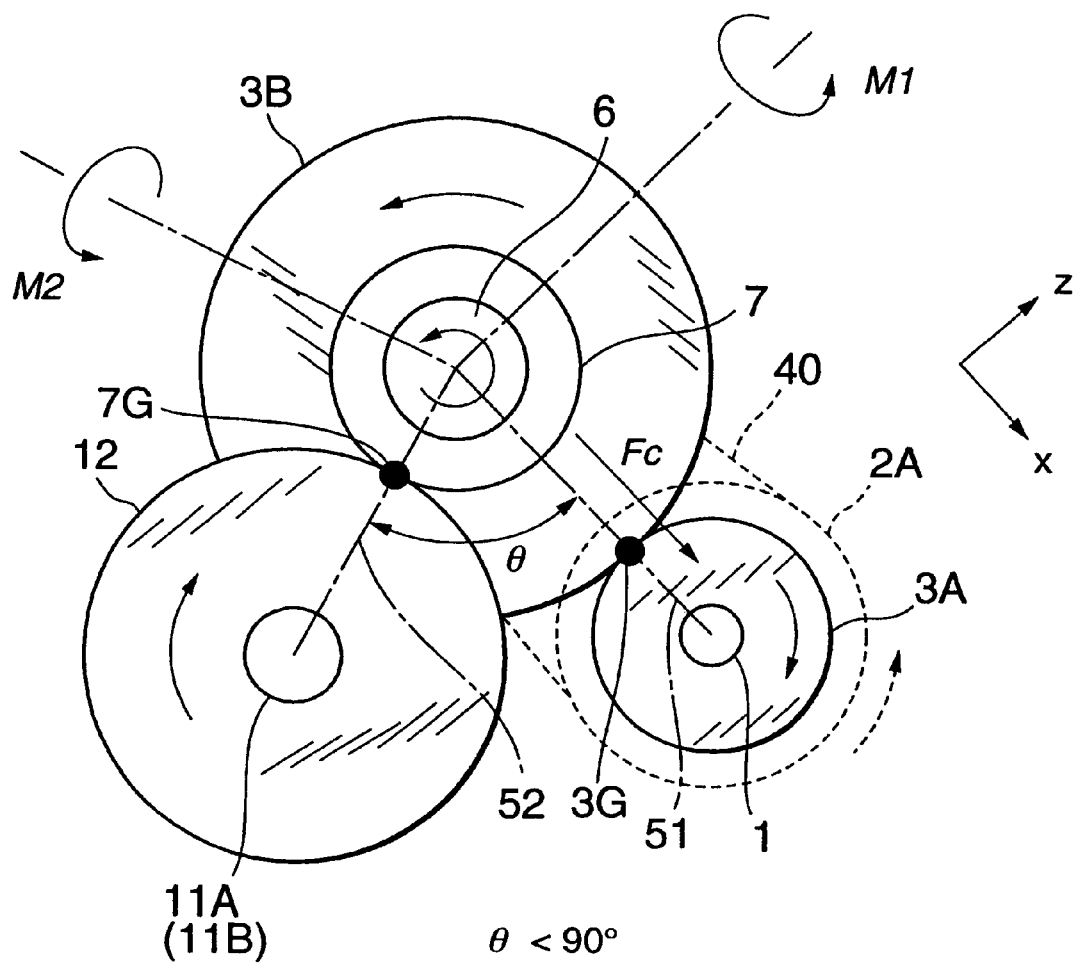
FIG. 3 is a schematic side view of the infinite speed ratio transmission device.

Referring to FIG. 3, an angle θ formed by a line 51 connecting the centers of the final output shaft 6 and input shaft 1, and a line 52 connecting the centers of the drive wheel shaft 11A and final output shaft 6 when viewed from the front face of the end 6B of the final output shaft 6, is set to be less than a right angle.

Here, a perpendicular dropped from an engaging position 7G of the device output gear 7 and final gear 12 to the line 51 intersects with the line 51 between the input shaft 1 and final output shaft 6.

Next, the setting of the rotation directions of the shafts and the tooth trace directions of the helical gears when the vehicle is moving forward in the power circulation mode, will be described.

Referring to FIG. 3, if the rotation direction of the input shaft 1 is clockwise, the input gear 3A of the fixed speed ratio transmission 3 will rotate clockwise, and the output gear 3B will rotate counterclockwise.

The planetary gear 5B joined to the output gear 3B via the power circulation clutch 9 also rotate counterclockwise.

In the CVT 2, as the rotation directions of the input disk 21 and output disk 22 are opposite to one another, the sprocket 2A rotates counterclockwise, and the sprocket 4A connected via a chain 40 also rotates counterclockwise.

The sun gear 5A joined to the sprocket 4A via the CVT output shaft 4 also rotates counterclockwise.

Here, considering that clockwise rotation of the final gear 12 corresponds to forward motion of the vehicle, the rotation directions of the final output shaft 6 and the ring gear 5C at this time are counterclockwise.

When the rotation directions of the gears are set in this way, as for the turning directions of the output gear 3A, tooth trace directions of the device output gear 7 and the final gear 12, each of which comprises a helical gear, are defined as follows. The tooth trace of the output gear 3B is a right-hand helix, while the tooth trace of device output gear 7 is a left-hand helix. The tooth trace of the input gear 3A is a left-hand helix, while the tooth trace of the final gear is a right-hand helix.

Herein, the right-hand helix means the turning direction shown by the slanting line in the output gear 3B of FIG. 2, and the left-hand helix means the turning direction shown by the slanting line in the output gear 3A of FIG. 2.

Regarding the transmission of the engine torque between the helical gears, it [In the fixed speed ratio transmission device 3, the engine torque] is transmitted from the gear 3A to the output gear 3B, [in the CVT 2, it is transmitted from the output sprocket 2A to the sprocket 4A via the chain 40, and in the planetary gear set 5, it is transmitted from the sun gear 5A to the ring gear 5C,] and from the device output gear 7 to the final gear 12.

Therefore, if the thrust force acting on the output gear 3B of the fixed speed ratio transmission 3 is Fg and the thrust force acting on the device output gear 7 is Fo, from the directions of the helices of the helical gears and the torque transmission direction, the thrust forces Fg and Fo act toward the left of the figure, i.e., toward the end 6A of the final output shaft, as shown in FIG. 2. This direction of thrust force will be taken as a positive thrust force, and the thrust force acting toward the end 6B on the opposite side will be taken as a negative thrust force.

The thrust force Fg acts on an engaging part 3G between the output gear 3B and input gear 3A, and the thrust force Fo acts on an engaging part 7G between the device output gear 7 and final gear 12, these forces being respectively parallel to the final output shaft 6.

Here, the thrust force Fg exerts a moment M1 on the final output shaft 6 depending on the radius of the output gear 3B.

The moment M1 is generated about the Z axis shown in FIG. 3, and its direction is counterclockwise as shown in FIG. 2.

On the other hand, the thrust force Fo acting on the transmission device output gear 7 exerts a moment M2 on the final output shaft 6 depending on the radius of the transmission device output gear 7

The axis which is the center of the moment M2 makes an angle θ to the Z axis.

Therefore, regarding the X-Y plane shown in FIG. 2, a component moment M2' of the moment M2 around the Z axis acts on the final output shaft 6.

The final output shaft 6 and input shaft 1 are connected via the chain 40, and a tension Fc of the chain 40 acts on the final output shaft 6 as shown in FIGS. 2 and 3.

Figure 4:
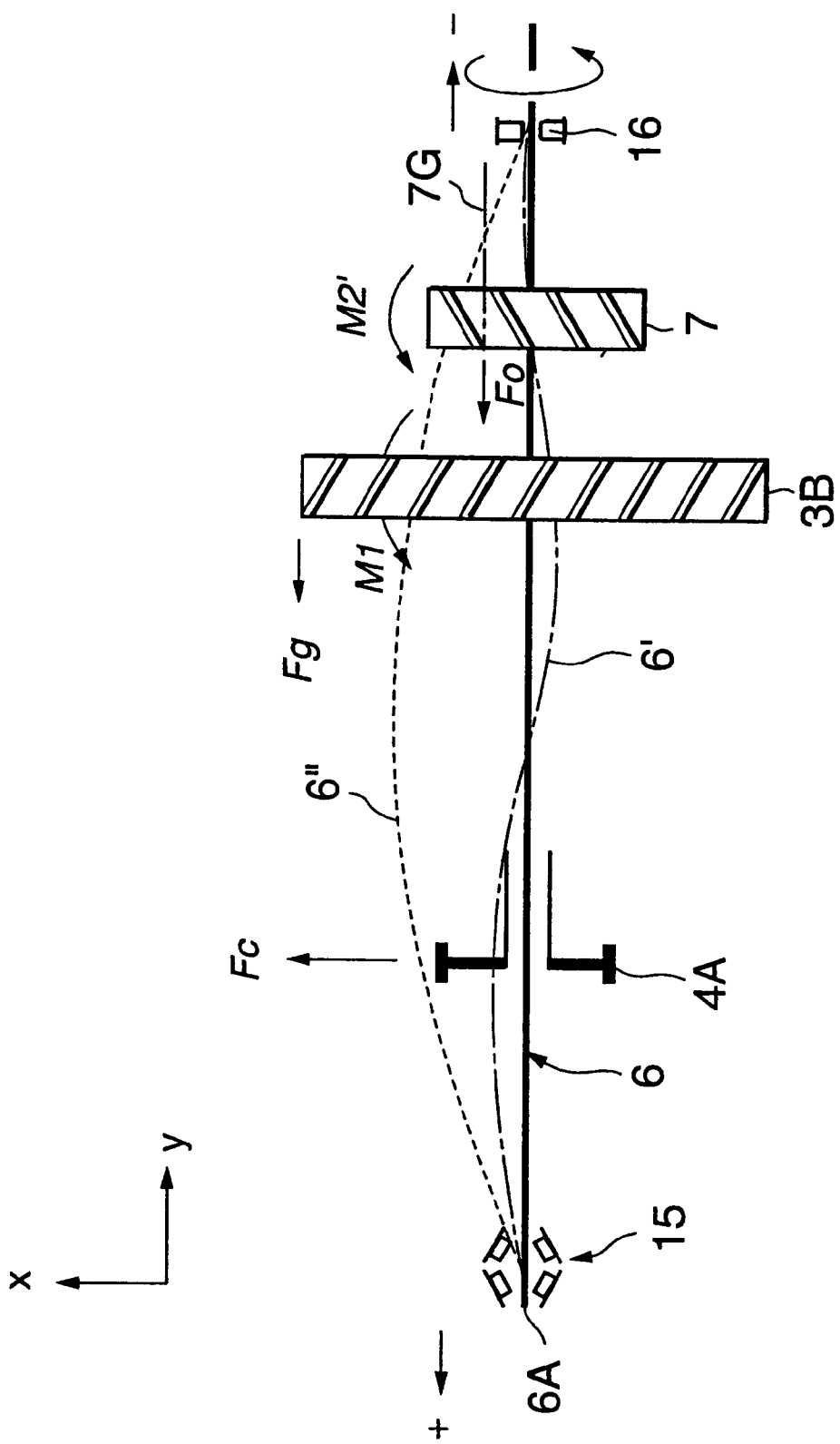
FIG. 4 is a diagram showing the relation of a bending deformation of a final output shaft to a bending moment acting on the helical gears.

Therefore, in the X-Y plane, the final output shaft 6 whereof the ends 6A, 6B are supported by the angular bearing 15 and the radial bearing 16 receives a bending load oriented toward the input shaft 1 due to the tension Fc of the chain 40, and the moments M1 and M2 act in a direction tending to cancel the bending stress due to the tension Fc, as shown in FIG. 4.

Whereas the bending load due to the tension Fc tends to twist the final output shaft 6 as shown by the broken line 6″ in FIG. 4, the moments M1 and M2 work to reduce the deformation of the output shaft 6 as shown by the dotted line 6' in the figure.

Figure 5:
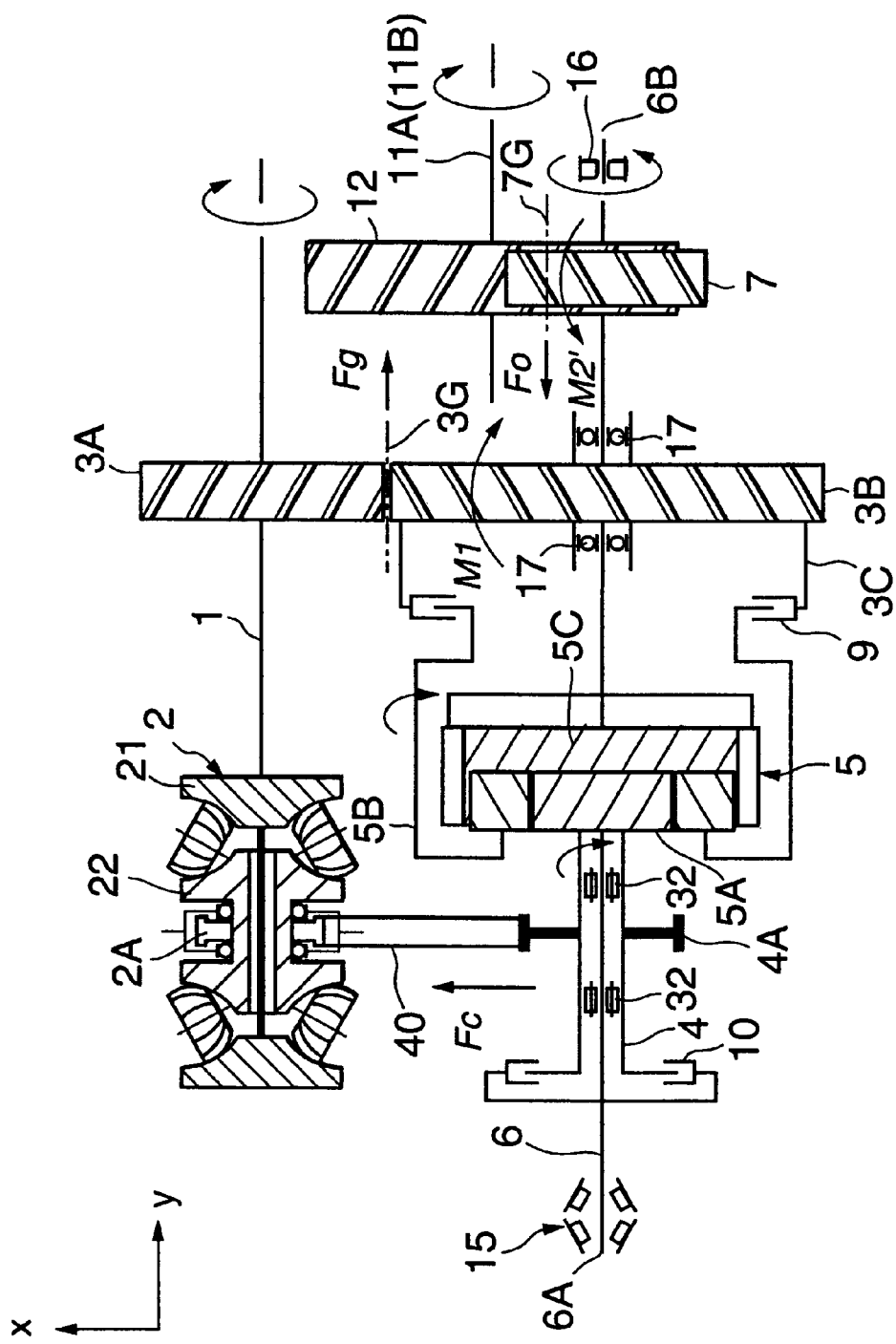
FIG. 5 is similar to FIG. 2, but showing a second embodiment of this invention.

Next, a second embodiment of this invention will be described referring to FIG. 5.

In this embodiment, the helix of the output gear 3B of the first embodiment is changed from right-hand to left-hand, and correspondingly, the helix of the output gear 3A is changed from left-hand to right-hand.

The remaining features of the construction are identical to those of the first embodiment.

According to this embodiment, when the vehicle moves forward in the power circulation mode, the thrust force Fg acting on the output gear 3B is negative, and the moment M1 which the output gear 3B exerts on the final output shaft 6 is in the clockwise direction of the figure.

On the other hand, the thrust force Fo acting on the transmission device output gear 7 is positive, and the component moment M2 which the device output gear 7 exerts on the final output shaft 6 in the X-Y plane is in a counterclockwise direction.

Therefore, the component moment M2' acts to cancel the bending stress due to the tension Fc and the moment M1.

Figure 6:
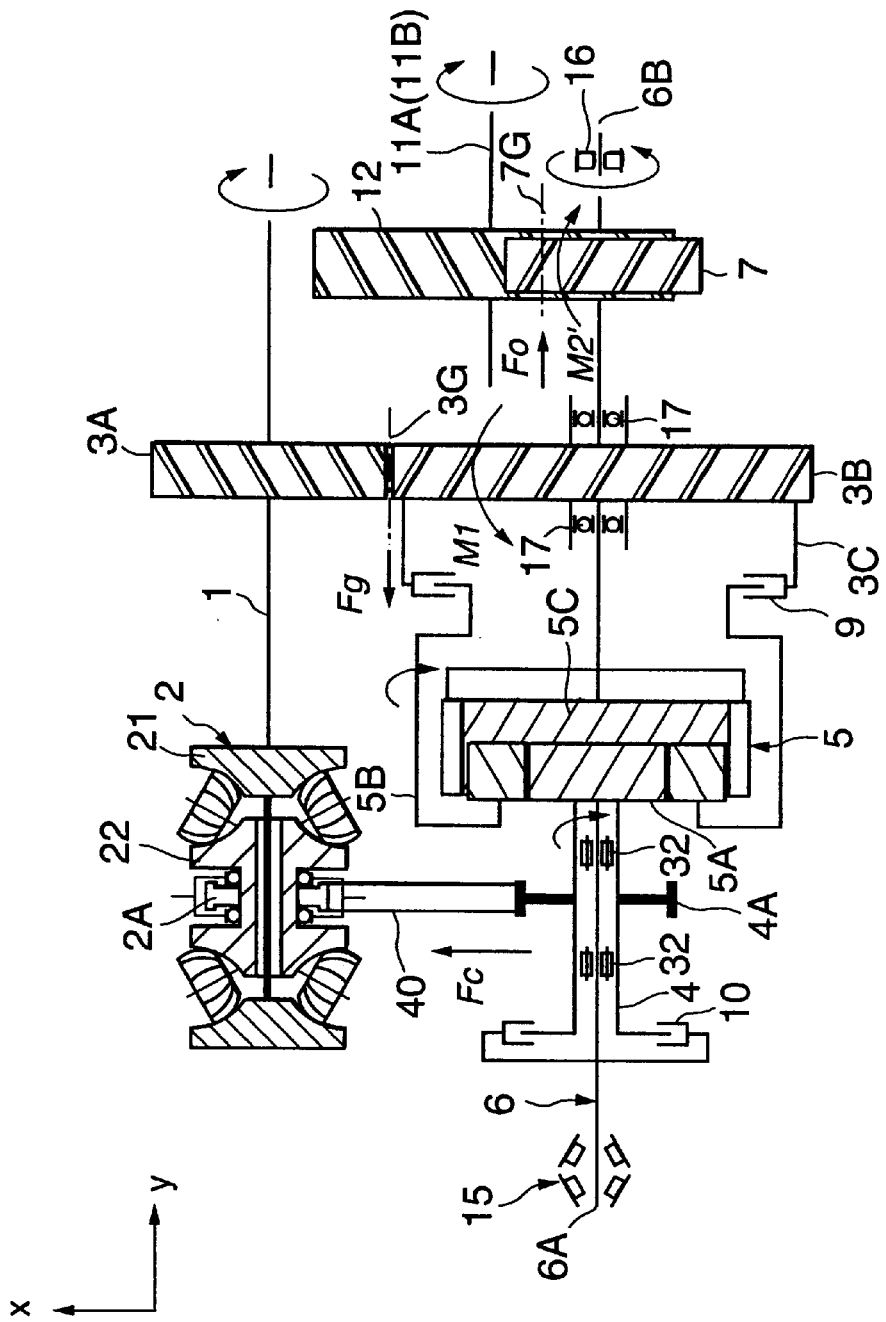
FIG. 6 is similar to FIG. 2, but showing a third embodiment of this invention.

A third embodiment of this invention will now be described referring to FIG. 6.

In this embodiment, the helix of the device output gear 7 of the first embodiment is changed from left-hand to right-hand. Correspondingly, the helix of the final gear 12 is changed from right-hand to left-hand.

The remaining features of the construction are identical to those of the first embodiment.

According to this embodiment, when the vehicle moves forward in the power circulation mode, the thrust force Fo acting on the device output gear is negative, and the moment M2' which the device output gear 7 exerts on the final output shaft 6 in the X-Y plane is in the clockwise direction of the figure. On the other hand, the thrust force Fg acting on the output gear 3B is positive, and the moment M1 which the output gear 3B exerts on the final output shaft 6 is anticlockwise. Therefore, the moment M1 acts to cancel the bending stress due to the tension Fc and the component moment M2'.

Figure 7:
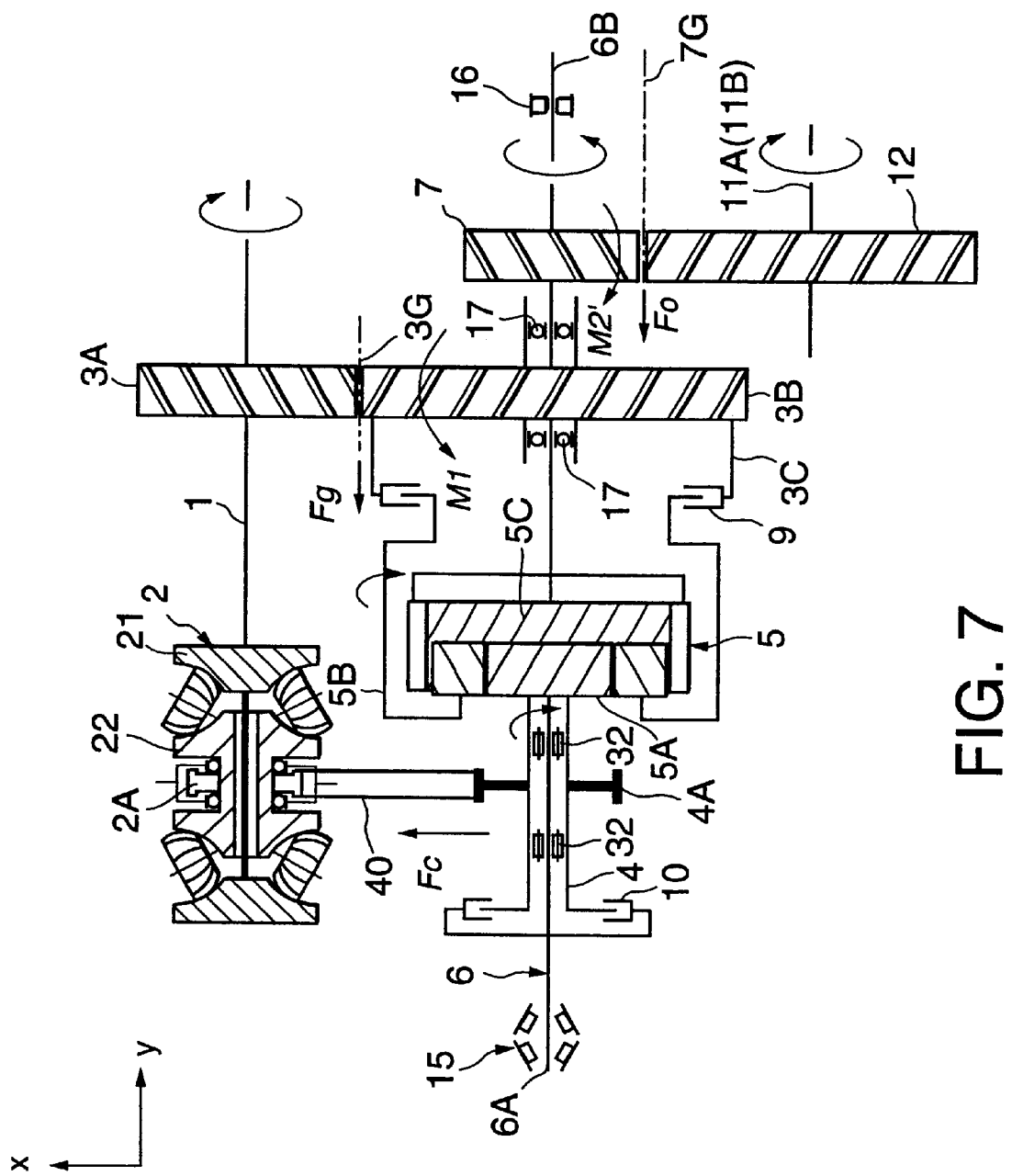
FIG. 7 is similar to FIG. 2, but showing a fourth embodiment of this invention.
Figure 8:
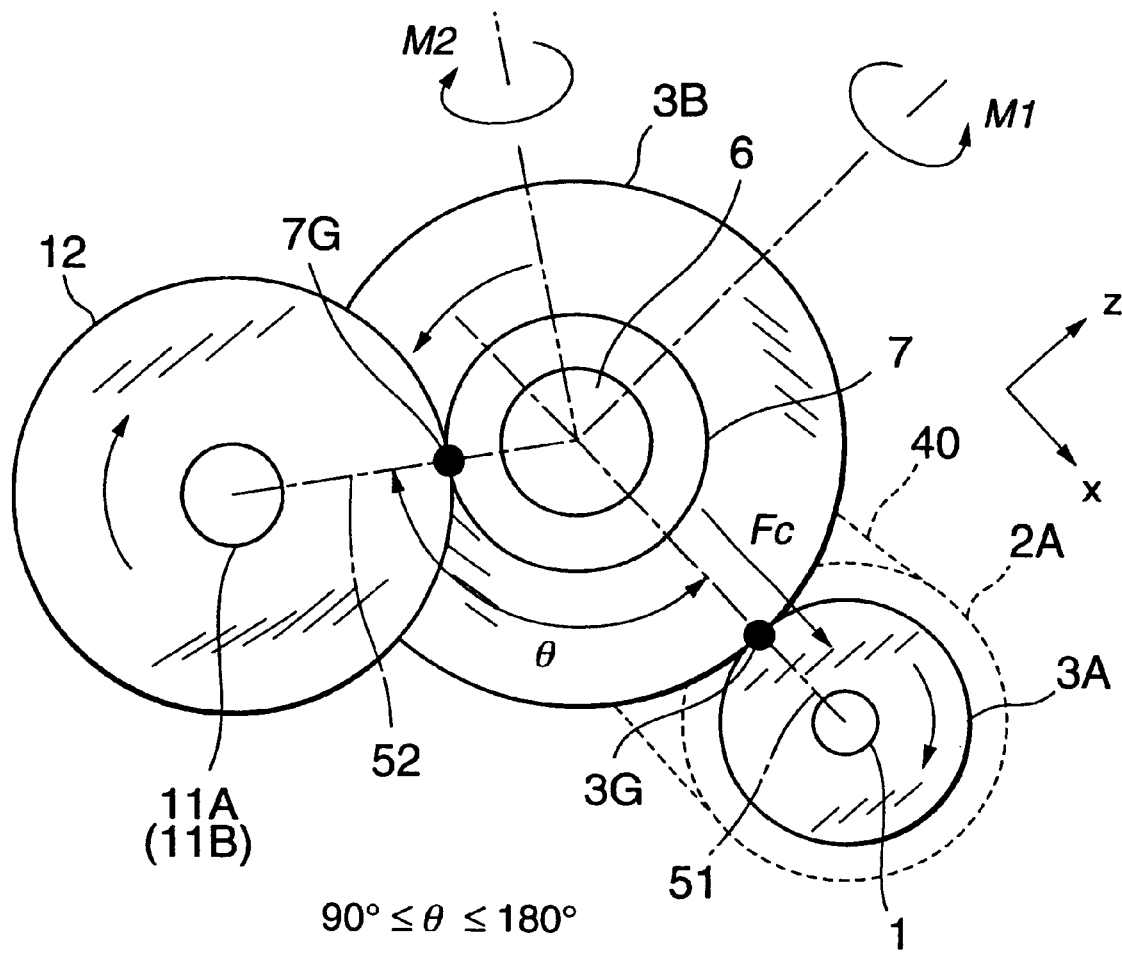
FIG. 8 is similar to FIG. 3, but showing the fourth embodiment of this invention.

Next, a fourth embodiment of this invention will be described referring to FIGS. 7 and 8.

In this embodiment, an angle θ formed by a line 51 connecting the centers of the final output shaft 6 and input shaft 1, and a line 52 connecting the centers of the final output shaft 6 and drive wheel shaft 11A, is set to be from an angle between 90 degrees and 180 degrees. The rotation directions of the shafts and the tooth traces of the helical gears are identical to those of the first embodiment.

According to this embodiment, when the vehicle moves forward in the power circulation mode, the thrust force Fg acting on the output gear 3B and the thrust force Fo acting on the device output gear 7 are both positive. However, a perpendicular dropped from an engaging position 7G of the output gear 7 and final gear 12 to the line 51 intersects with the line 51 on the opposite side of the input shaft 1 relative to the final output shaft 6, so the component moment M2' which the thrust force Fo causes to act on the output shaft 6 in the X-Y plane is clockwise conversely to the first embodiment as shown in FIG. 7.

On the other hand, as the moment M1 exerted by the thrust force Fg on the final output shaft 6 is anticlockwise as in the first embodiment, the moment M1 acts to cancel the bending stress of the final output shaft 6 due to the tensile force Fc of the chain 40 and the component moment M2'.

Figure 9:
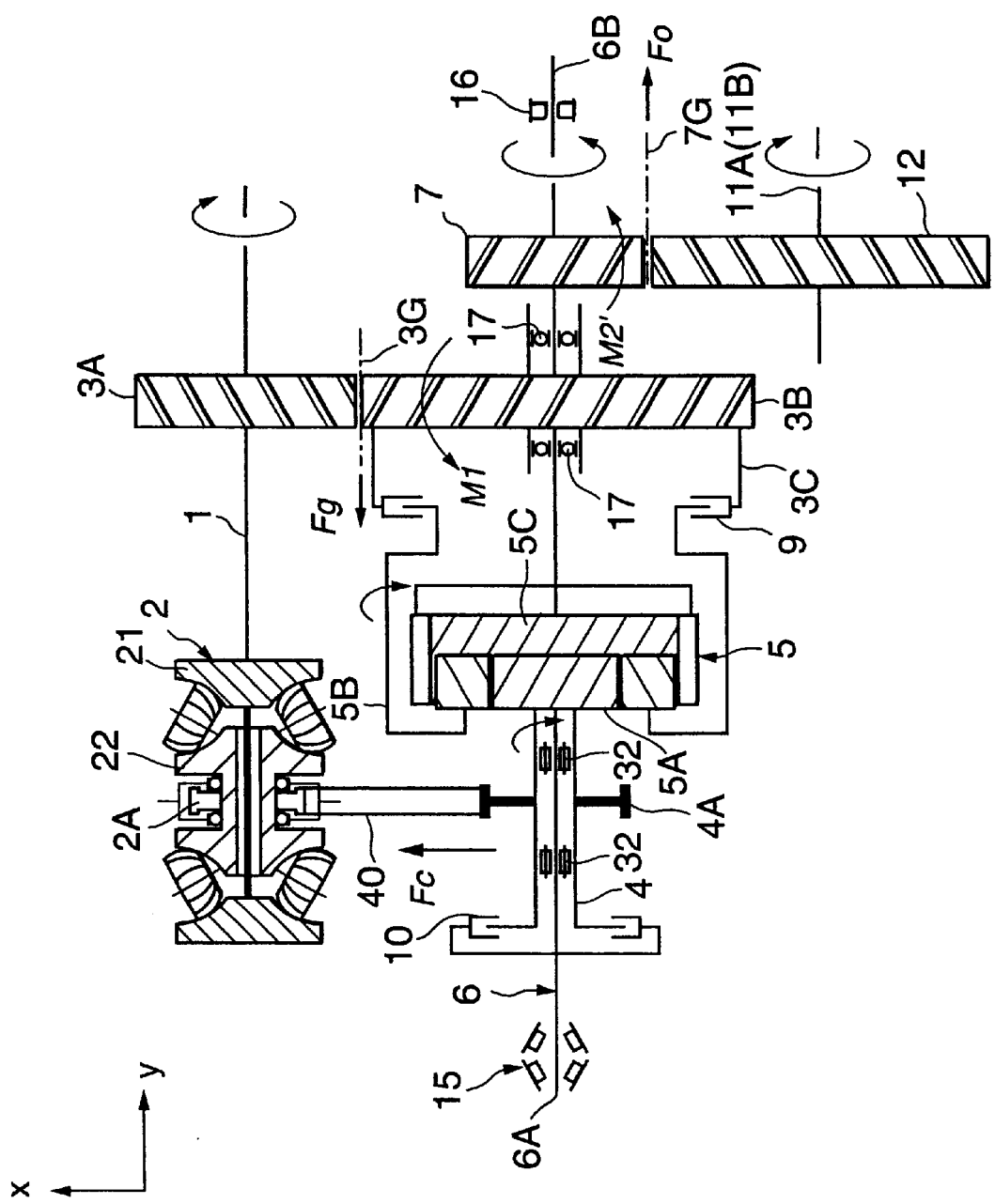
FIG. 9 is similar to FIG. 2, but showing a fifth embodiment of this invention.

A fifth embodiment of this invention will now be described referring to FIG. 9.

In this embodiment, the helix of the device output gear 7 of the fourth embodiment is changed from left-hand to right hand. Correspondingly, the helix of the final gear 12 is changed from right-hand to left-hand. The remaining features of the construction are identical to those of the first embodiment.

According to this embodiment, when the vehicle moves forward in the power circulation mode, the thrust force Fg acting on the output gear 3B is positive, and the force Fo acting on the transmission device output gear 7 is negative. However, as the point of action of the thrust force Fo is below the final output shaft 6 in the X-Y plane, the component moment M2' which the device output gear 7 exerts on the final output shaft 6 is in a counterclockwise direction.

Therefore, the moment M1 which the output gear 3B of the fixed speed ratio transmission 3 exerts on the final output shaft 6 and the component moment M2' which the transmission device output gear 7 causes to act on the final output shaft are both anticlockwise, and these moments act to cancel the bending stress of the final output shaft 6 due to the tensile force Fc of the chain 40.

Figure 10:
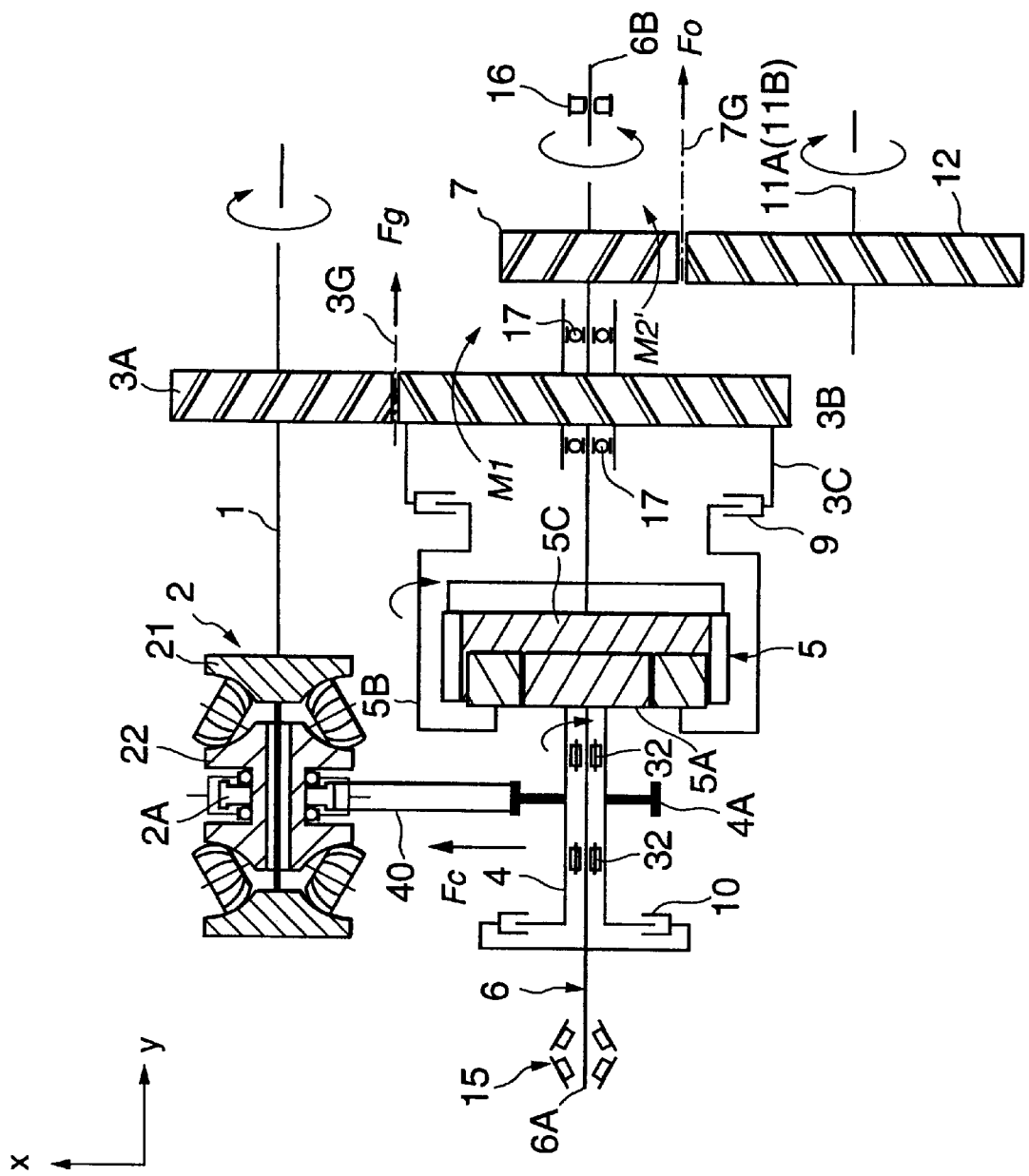
FIG. 10 is similar to FIG. 2, but showing a sixth embodiment of this invention.

A sixth embodiment of this invention will now be described referring to FIG. 10.

In this embodiment, the helix of the output gear 3B of the fixed speed ratio transmission 3 of the fourth embodiment is changed from left-hand to right-hand, and correspondingly, the helix of the output gear 3A is changed from left-hand to right-hand. Further, the helix of the device output gear 7 is changed from left-hand to right-hand and correspondingly, the helix of the final gear 3A is changed from right-hand to left-hand. The remaining features of the construction are identical to those of the fourth embodiment.

According to this embodiment, when the vehicle moves forward in the power circulation mode, the thrust force Fg acting on the output gear 3B and the thrust force acting on the transmission device output gear 7 are both negative.

As a result, the moment M1 which the output gear 3B exerts on the final output shaft 6 in the X-Y plane is clockwise and the component moment M2' which the transmission device output 7 exerts on the final output shaft 6 acts in an anticlockwise direction.

Accordingly, the component moment M2' acts to cancel the bending stress due to the tensile force Fc of the chain 40 and the moment M1.

Next, a seventh embodiment of this invention will be described referring to FIGS. 11 and 12.

According to this embodiment, the rotation directions of the input shaft 1, final output shaft 6 and drive wheel shaft 11A are respectively set opposite to those of the first embodiment. The anticlockwise rotation of the final gear 12 is set so that the vehicle moves forward conversely to the case of the first embodiment. The rotation of the final output shaft 6 and the ring gear 5C at this time, is clockwise. Further, the helix of the output gear 3B of the first embodiment is changed from right-hand to left-hand, and correspondingly, the helix of the output gear 3A is changed from left-hand to right-hand.

The remaining features are identical to those of the first embodiment.

Figure 12:
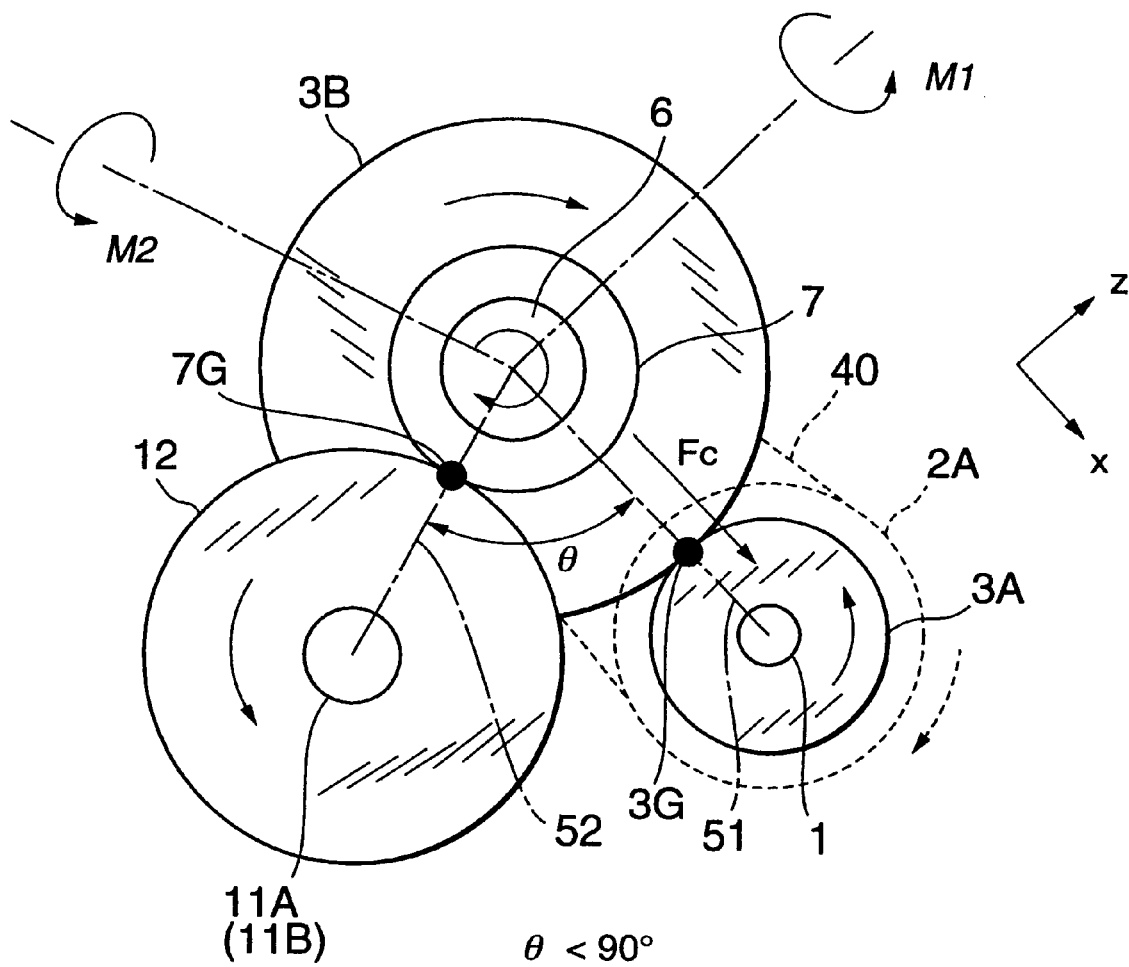
FIG. 12 is similar to FIG. 3, but showing the seventh embodiment of this invention.

As shown in FIG. 12, according to this example, the output gear 3B of the fixed speed ratio transmission 3 rotates clockwise, the sprocket 2A rotates clockwise, and the sprocket 4A connected to the sprocket 2A via the chain 40 and the sun gear 5A joined to the sprocket 4A via the CVT output shaft 4, also rotate clockwise.

Figure 11:
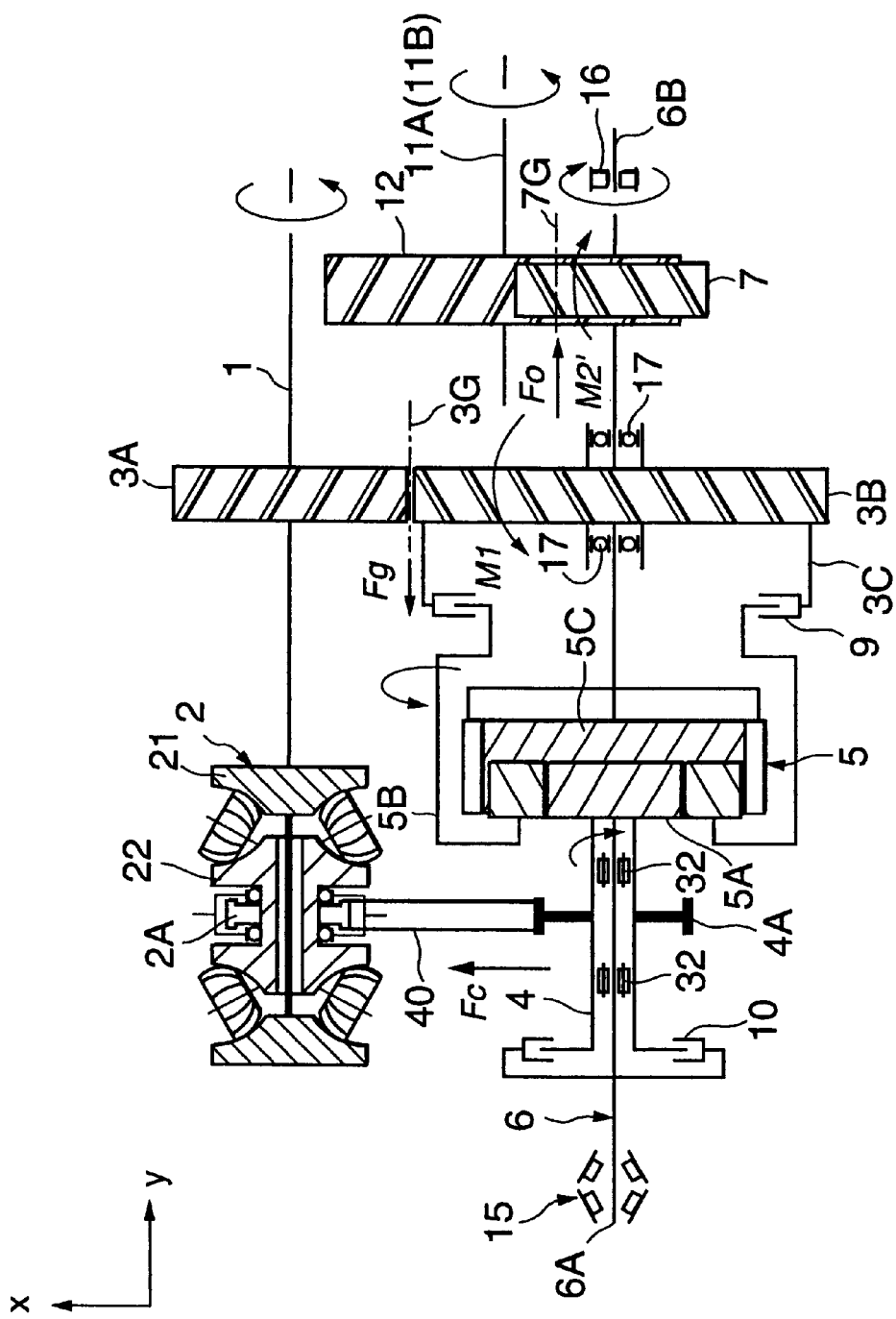
FIG. 11 is similar to FIG. 2, but showing a seventh embodiment of this invention.

According to this embodiment, when the vehicle moves forward in the power circulation mode, the thrust force Fg acting on the output gear 3B is positive, and the thrust force Fo acting on the transmission device output gear 7 is negative, as shown in FIG. 11.

Therefore, the moment M1 which the output gear 3B of the fixed speed ratio transmission 3 exerts on the final output shaft 6 is anticlockwise in the figure, but the moment M2' which the device output gear 7 exerts on the final output shaft 6 is clockwise.

Therefore, the moment M1 acts to cancel the bending stress due to the tension Fc and the component moment M2'.

Figure 13:
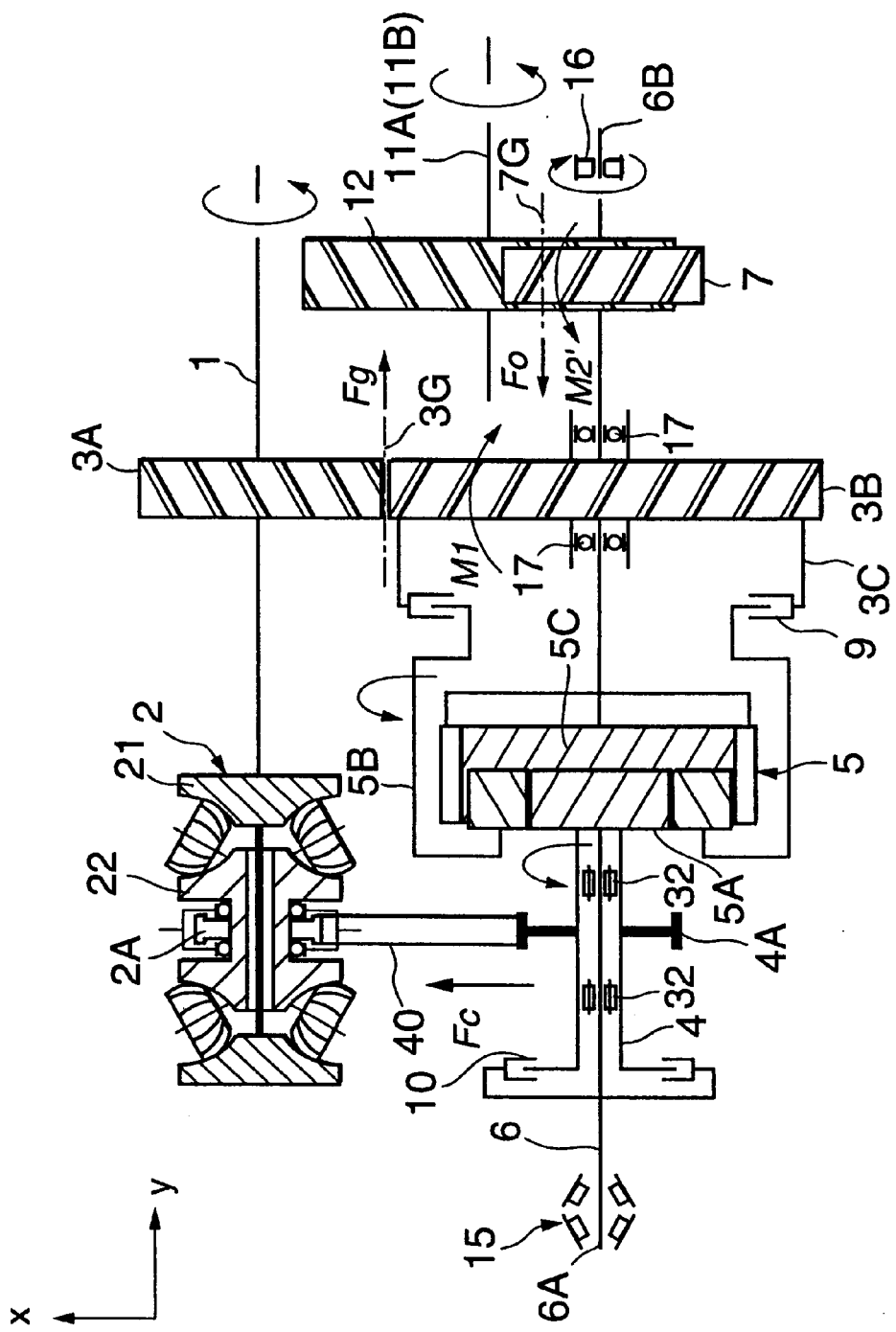
FIG. 13 is similar to FIG. 2, but showing an eighth embodiment of this invention.

An eighth embodiment of this invention will now be described referring to FIG. 13.

In this embodiment, the helix of the output gear 3B of the fixed speed ratio transmission 3 of the seventh embodiment is changed from left-hand to right-hand, and correspondingly, the helix of the output gear 3A is changed from right-hand to left-hand. Further, the helix of the device output gear 7 is changed from left-hand to right-hand, and correspondingly, the helix of the final gear 12 is changed from right-hand to left hand. The remaining features of the construction are identical to those of the seventh embodiment.

According to this embodiment, when the vehicle moves forward in the power circulation mode, the thrust force Fg acting on the output gear 3B is negative, and the moment M1 which the output gear 3B exerts on the final output shaft 6 is clockwise in the figure.

On the other hand, the thrust force Fo acting on the transmission device output gear 7 is positive, and the component moment M2' which the device output gear 7 exerts on the final output shaft 6 in the X-Y plane is anticlockwise. Therefore, the component moment M2' acts to cancel the bending stress due to the tension Fc and the moment M1.

Figure 14:
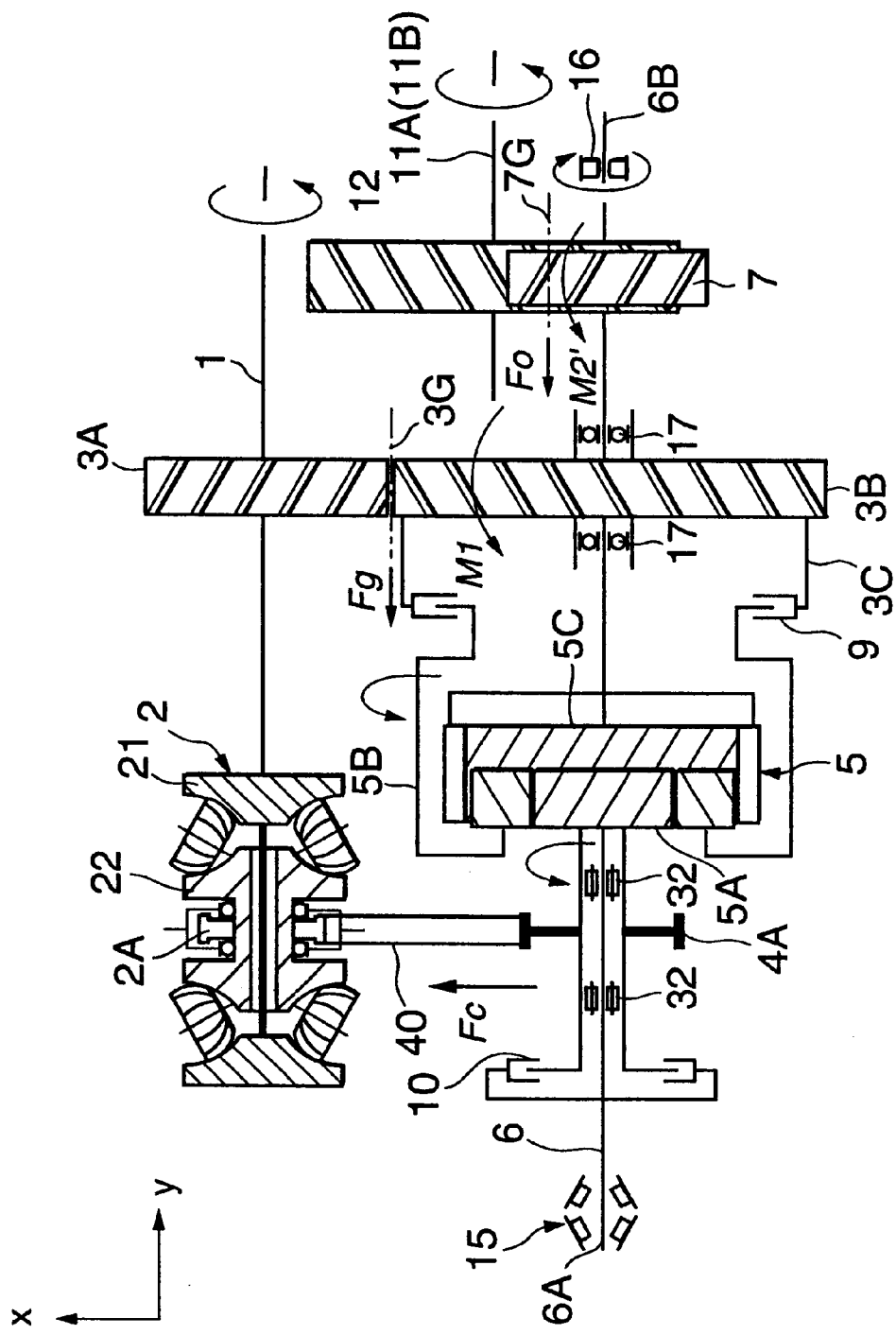
FIG. 14 is similar to FIG. 2, but showing a ninth embodiment of this invention.

A ninth embodiment of this invention will now be described referring to FIG. 14.

In this embodiment, the helix of the device output gear 7 of the seventh embodiment is changed from left-hand to right-hand, and correspondingly, the tooth trace of the final gear 12 is changed from right-hand to left-hand. The remaining features of the construction are identical to those of the seventh embodiment.

According to this embodiment, when the vehicle moves forward in the power circulation mode, the thrust force Fo acting on the device output gear 7 is positive, and the moment M2' which the device output gear 7 exerts on the final output shaft 6 in the X-Y plane is anticlockwise. The thrust force Fg acting on the output gear 3B is positive, and the moment M1 which the output gear 3B of the fixed speed ratio transmission 3 exerts on the final output shaft 6 is anticlockwise. The moment M1 and component moment M2' therefore act to cancel the bending stress of the final output shaft 6 due to the tensile force Fc of the chain 40.

Figure 15:
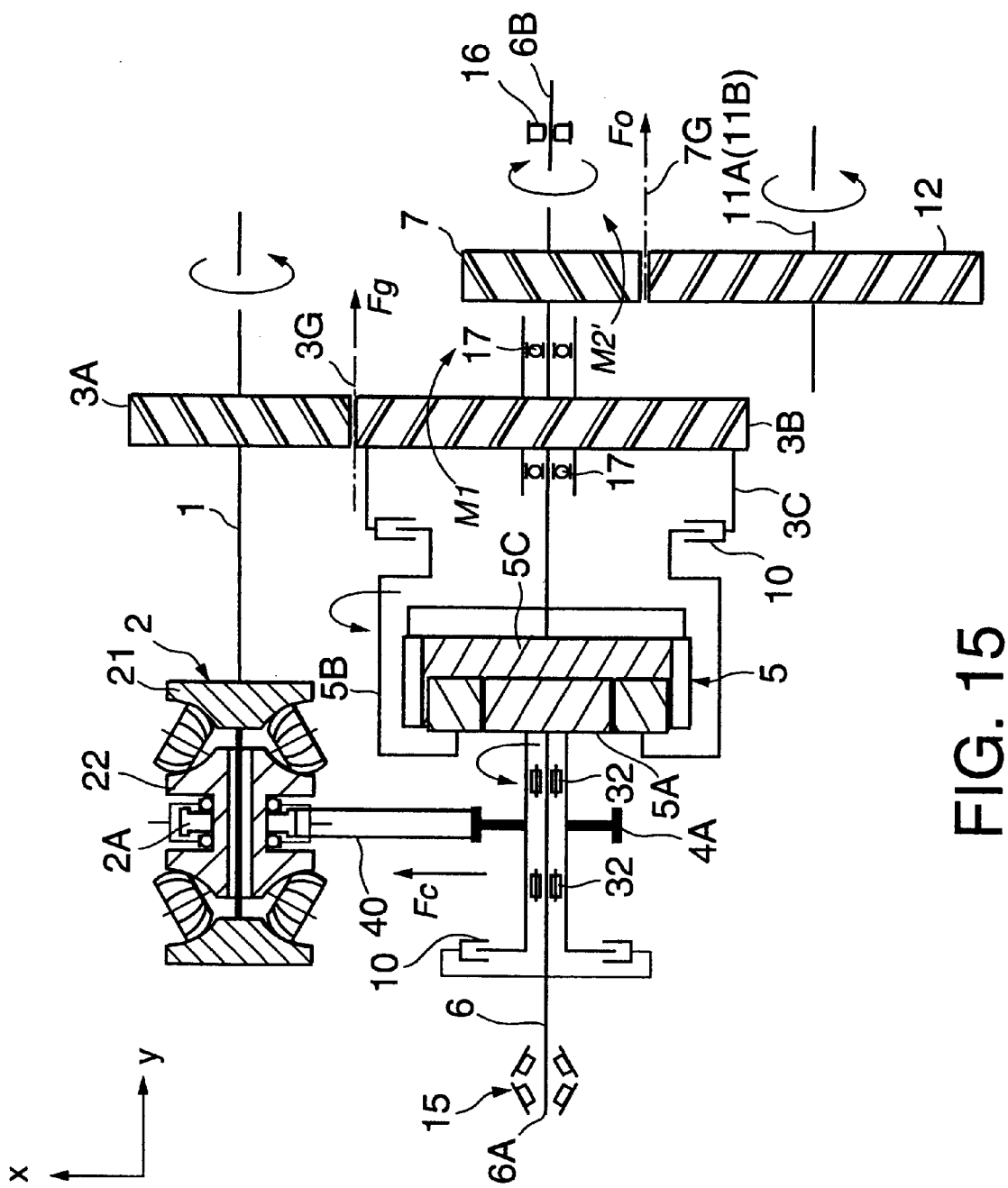
FIG. 15 is similar to FIG. 2, but showing a tenth embodiment of this invention.

A tenth embodiment of this invention will now be described referring to FIG. 15.

According to this embodiment, the rotation directions of the input shaft 1, final output shaft 6 and drive wheel shaft 11A are respectively set opposite to those of the fourth embodiment.

The remaining features of the construction are identical to the fourth embodiment.

According to this embodiment, the output gear 3B of the fixed speed ratio transmission 3 rotates clockwise, and the planetary gear 5B rotates clockwise.

The output sprocket 2A rotates clockwise, and the sprocket 4A connected via the chain 40 and sun gear 5A joined to the sprocket 4A via the CVT output shaft 4, are caused to rotate clockwise.

The anticlockwise rotation of the final gear 12 corresponds to forward motion of the vehicle conversely to the case of the fourth embodiment. The rotation direction of the final output shaft 6 and the ring gear 5C at this time, is clockwise.

According to this embodiment, the helix of the output gear 3B is right-hand, while the helix of the input gear 3A is left-hand. Further, the helix of the device output gear 7 is left-hand, and correspondingly, the helix of the final gear 12 is right-hand.

As a result, when the vehicle moves forward in the power circulation mode, the thrust force Fg acting on the output gear 3B is negative, and the thrust force acting on the transmission device output gear 7 is also negative.

Accordingly, the moment M1 which the output gear 3B exerts on the final output shaft 6 acts in the clockwise direction of the figure. On the other hand, as the point of action of the thrust force Fo is situated below the final output shaft 6 in the figure, the component moment M2' which the device output gear 7 exerts on the final output shaft 6 in the X-Y plane Is anticlockwise.

Therefore, the component moment M2' acts to cancel the bending stress due to the tension Fc and the moment M1.

Figure 16:
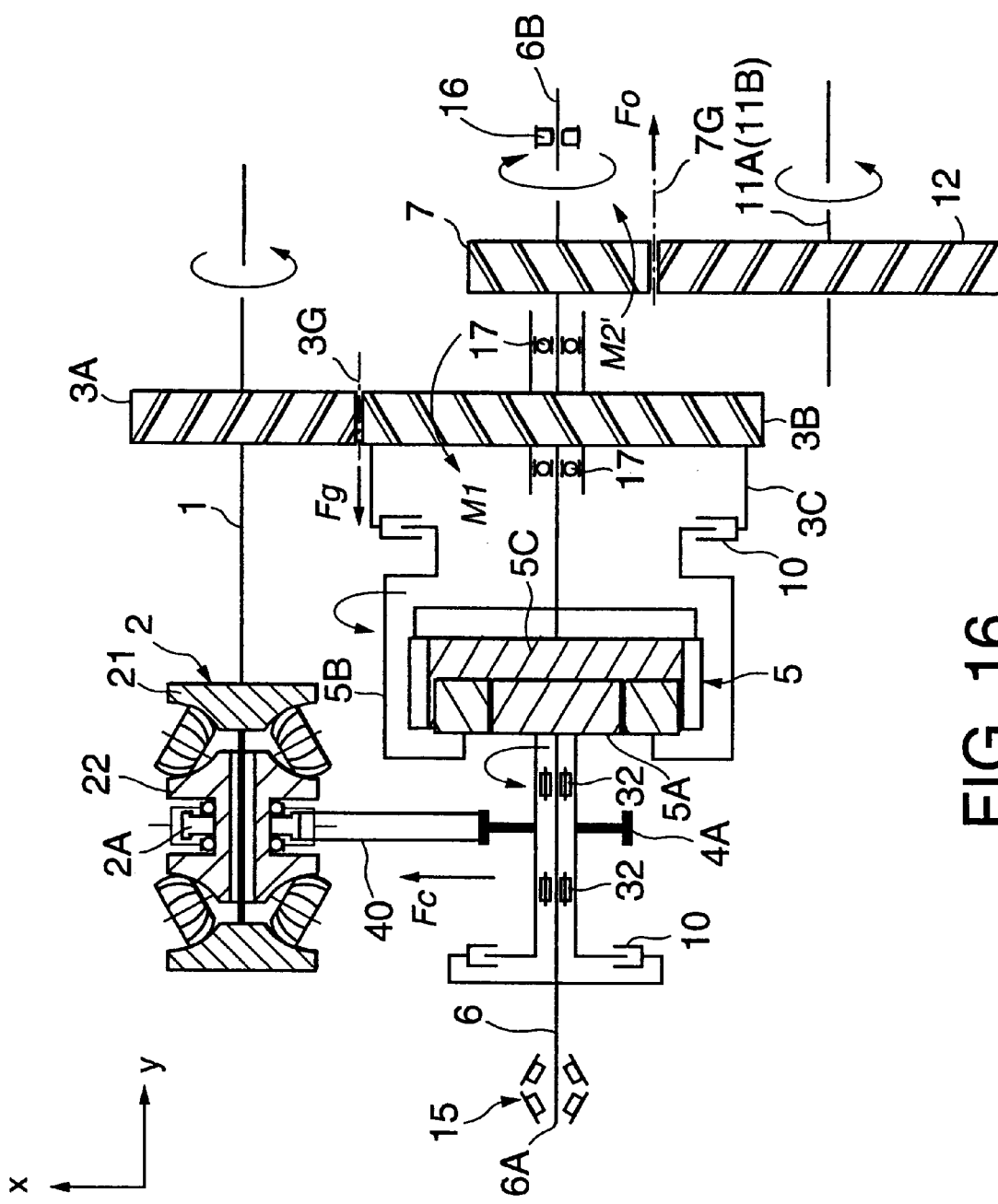
FIG. 16 is similar to FIG. 2, but showing an eleventh embodiment of this invention.

An eleventh embodiment of this invention will now be described referring to FIG. 16.

In this embodiment, the helix of the output gear 3B of the tenth embodiment is changed from right-hand to left-hand, and correspondingly, the helix of the input gear 3A is changed from left-hand to right hand. The remaining features of the construction are identical to those of the tenth embodiment.

According to this embodiment, when the vehicle moves forward in the power circulation mode, the thrust force Fg acting on the output gear 3B is positive, and the thrust force Fo generated by the transmission device output gear 7 is negative.

As a result, the moment M1 which the output gear 3B exerts on the final output shaft 6, and the component moment M2' which the device output gear 7 exerts on the final output shaft 6 in the X-Y plane, are both anticlockwise. Accordingly, the moment M1 and component moment M2' act to cancel the bending stress of the final output shaft 6 due to the tensile force Fc of the chain 40.

Figure 17:
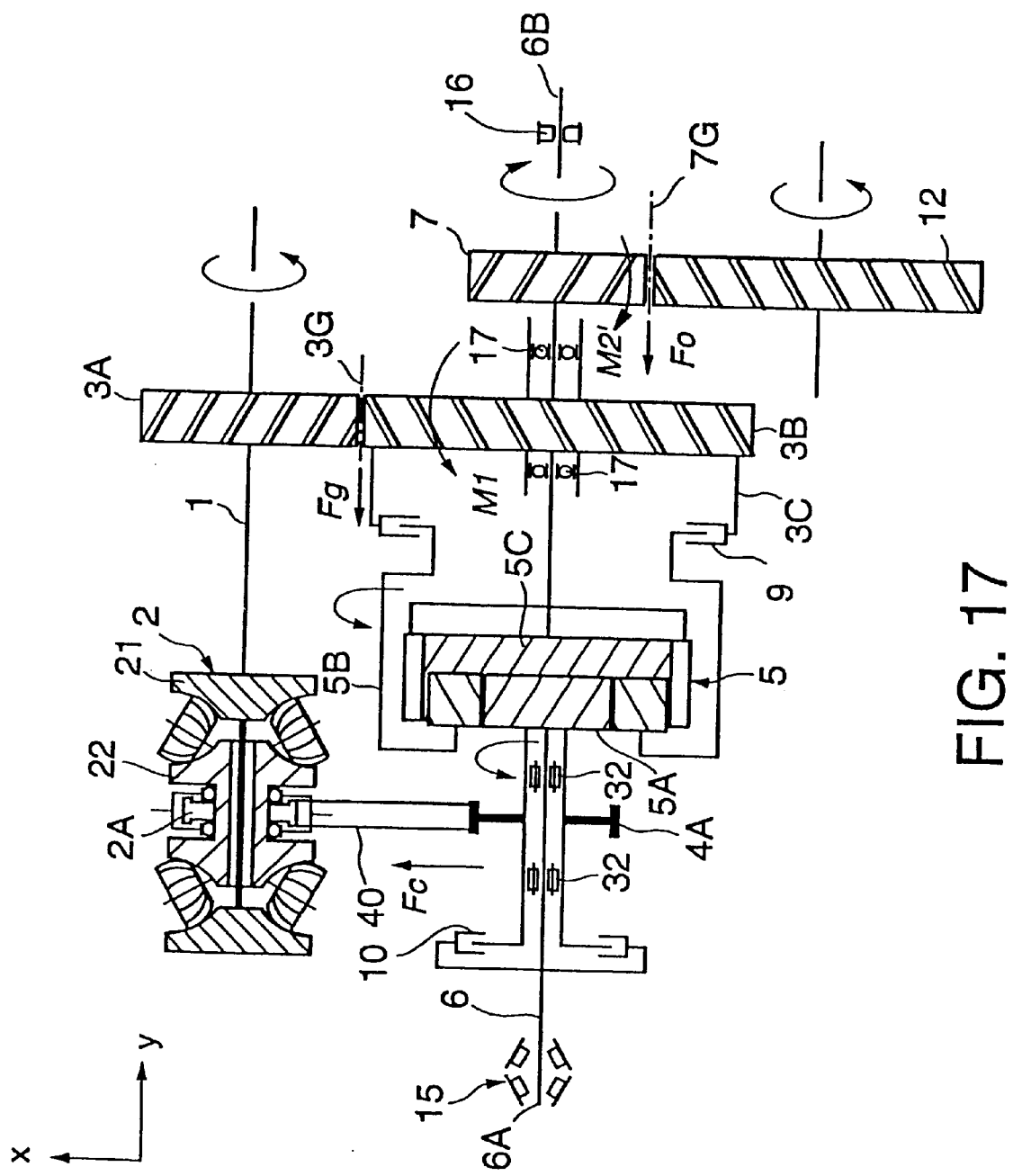
FIG. 17 is similar to FIG. 2, but showing a twelfth embodiment of this invention.

A twelfth embodiment of this invention will now be described referring to FIG. 17.

In this embodiment, the helix of the output gear 3B of the tenth embodiment is changed from right-hand to left-hand and correspondingly, the helix of the output gear 3A is changed from left-hand to right-hand. Further, the helix of the device output gear 7 is changed from left-hand to right-hand, and correspondingly, the helix of the final gear 12 is changed from right-hand to left-hand. The remaining features of the construction are identical to those of the tenth embodiment.

According to this embodiment, the thrust force Fg acting on the output gear 3B is positive, and the thrust force acting on the device output gear 7 is also positive.

Therefore, the moment M1 which the output gear 3B exerts on the final output shaft 6 is anticlockwise. On the other hand, as the point of action of the thrust force Fo is situated below the final output shaft 6 in the figure, the component moment M2' which the transmission device output gear 7 exerts on the final output shaft 6 in the X-Y plane is clockwise.

Therefore, the moment M1 acts to cancel the bending stress due to the tension Fc and the component moment M2'.

In the aforesaid embodiments, the directions of the helices of the output gear 3B and the device output gear 67 are determined such that the moment which the output gear 3B or device output gear 7 exert on the final output shaft 6 cancels the bending stress due to the tensile force Fc of the chain 40 on the final output shaft 6. Hence, by properly setting the directions of helices of the helical gears which exert a moment on the final output shaft 6, the bending of the final output shaft 6 can be reduced, the decline in durability of the bearings 15, 16 can be prevented, and friction between the final output shaft 6 and bearings 15, 16 is reduced so that motive power transmission efficiency of the transmission device is improved. Depending on the dimensions and positions of the output gear 3B and device output gear 7, the point of action and magnitude of the moments acting on the final output shaft 6 will vary, and it is desirable to select an embodiment from among the above embodiments according to these dimensions and positions so that the deformation of the final output shaft 6 is minimized.

The contents of Tokugan Hei 11-18260, with a filing date of Jan. 27, 1999 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

Figure 18:
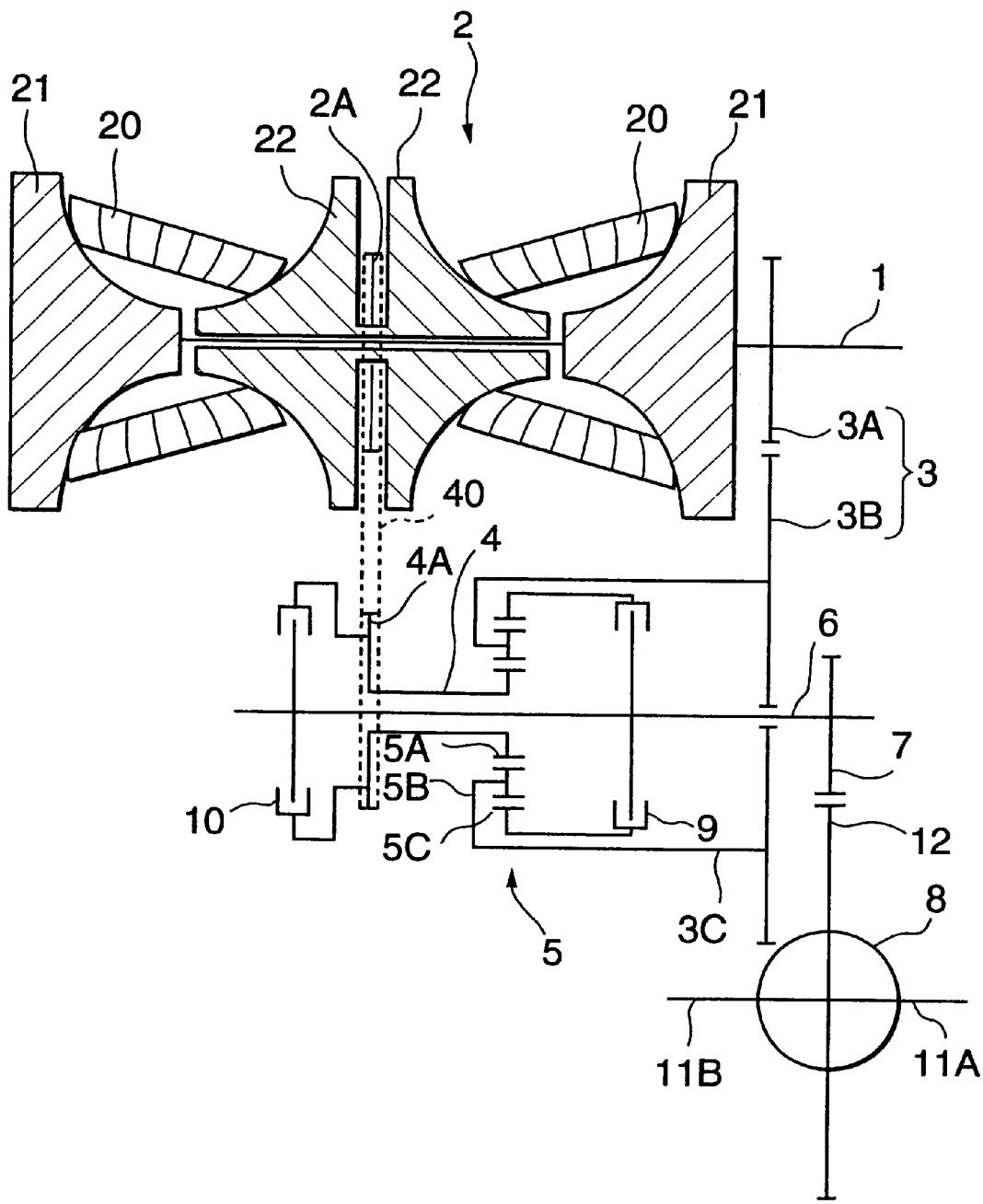
FIG. 18 is similar to FIG. 1, but showing a possible variation regarding the disposition of a power circulation clutch.
Figure 19:
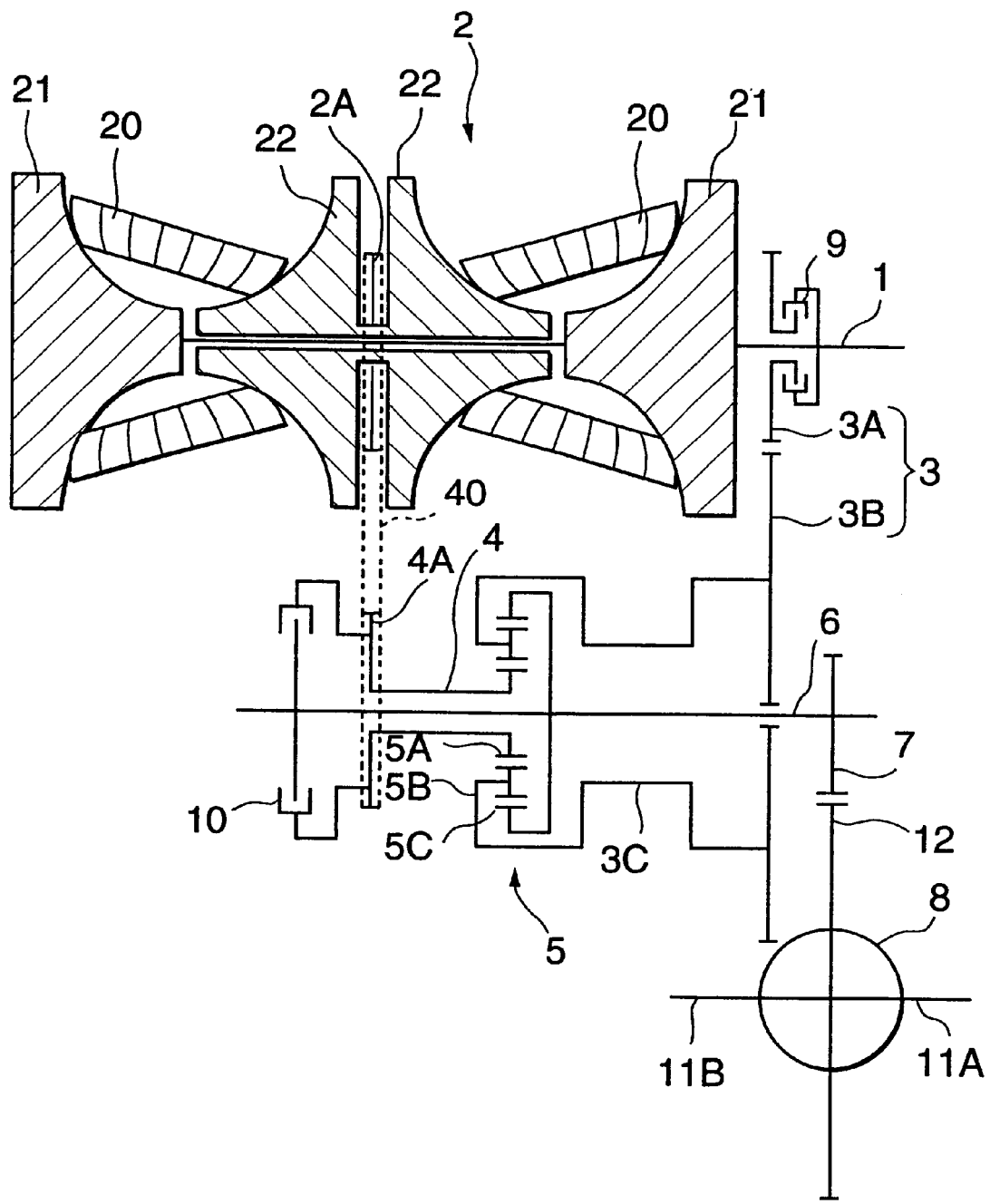
FIG. 19 is similar to FIG. 1, but showing another possible variation regarding the disposition of the power circulation clutch.
Figure 20:
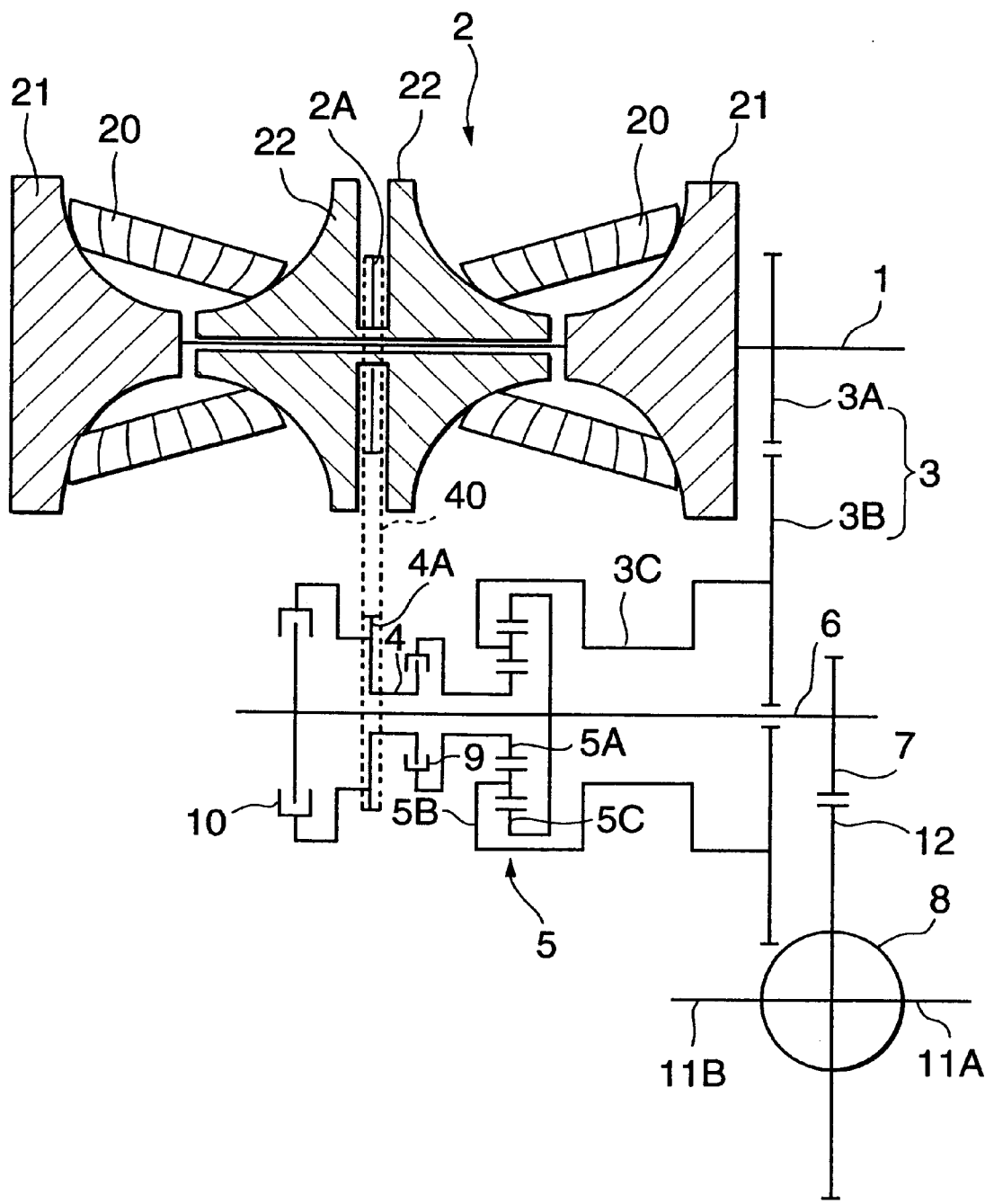
FIG. 20 is similar to FIG. 1, but showing still another possible variation regarding the disposition of the power circulation clutch.

For example, in each of the aforesaid embodiments, the power circulation mode clutch 9 was disposed between the output gear 3B of the fixed speed ratio transmission device 3 and the planetary gear 5B, but the power circulation mode clutch 9 may be disposed in any position between the input shaft 1 and the transmission device output gear 7. For example, the power circulation mode clutch 9 can be arranged between the ring gear 5C and final output shaft 6, as shown in FIG. 18. Alternately, the power circulation mode clutch 9 may be disposed between the input shaft 1 and the input gear 3A of the fixed speed ratio transmission 3, as shown in FIG. 19. Still further, it may be arranged midway along the CVT output shaft 4, as shown in FIG. 20. The aforesaid first-twelfth embodiments may be applied to any infinite speed ratio transmission device whatever the position of the power circulation mode clutch 9.

The embodiments of this invention in which an exclusive property or privilege is claimed are defined as follows:

What is claimed is:

1. An infinite speed ratio transmission device for a vehicle comprising:
    an input shaft;
    a final output shaft;
    a continuously variable transmission having a first sprocket and transmitting a rotation of the input shaft to the first sprocket at an arbitrary speed ratio;
    a fixed speed ratio transmission comprising an output gear formed on the final output shaft and an input gear which inputs the rotation of the input shaft and which is meshed with the output gear;
    a second sprocket formed on the final output shaft;
    a chain which transmits the rotation of the first sprocket to the second sprocket;
    a device output gear formed on the final output shaft;
    a final gear meshed with the device output gear; and
    a planetary gear set which causes the final output shaft to rotate according to the relative rotation of the second sprocket and the output gear;
    wherein the gear set of the device output gear and the final gear comprises helical gears having a slanting tooth trace, an angle made by a first line joining the input shaft and the final output shaft and a second line joining the center of the final gear and the final output shaft, is set to be less than 90 degrees, and the helical gears have tooth traces which, when a rotation is transmitted from the device output gear to the final gear, exert a thrust force parallel to the final output shaft on the device output gear in a direction of the second sprocket, so that the helical gears, when rotating, exerts a moment on the final output shaft in a direction to suppress a bending stress in the final output shaft due to a tension of the chain.

2. An infinite speed ratio transmission device for a vehicle comprising:
    an input shaft;
    a final output shaft;
    a continuously variable transmission having a first sprocket and transmitting a rotation of the input shaft to the first sprocket and an arbitrary speed ratio;
    a fixed speed ratio transmission comprising an output shaft formed on the final output shaft and an input gear which inputs the rotation of the input shaft and which is meshed with the output gear;
    a second sprocket formed on the final output shaft;
    a chain which transmits the rotation of the first sprocket to the second sprocket;
    a device output gear formed on the final output shaft;
    a final gear meshed with the device output gear; and
    a planetary gear set which causes the final output gear to rotate according to the relative rotation of the second sprocket and the output gear;
    wherein the gear set of the device output gear and the final gear comprises helical gears having a slanting tooth trace, an angle made by a first line joining the input shaft and the final output shaft and a second line joining the center of the final gear and the final output shaft, is set within a range from 90 degrees to 180 degrees, and the helical gears have tooth traces with which, when a rotation is transmitted from the device output gear to the final gear, exert a thrust force parallel to the final output shaft on the device output gear in a direction opposite to the second sprocket, so that the helical gears, when rotating, exerts a moment on the final output shaft in a direction to suppress a bending stress in the final output shaft due to a tension of the chain.

3. An infinite speed ratio transmission device for a vehicle comprising:

an input shaft;

a final output shaft;

a continuously variable transmission having a first sprocket and transmitting a rotation of the input shaft to the first sprocket at an arbitrary speed ratio;

a fixed speed ratio transmission comprising an output gear formed on the final output shaft and an input gear which inputs the rotation of the input shaft and which is meshed with the output gear;

a second sprocket formed on the final output shaft;

a chain which transmits the rotation of the first sprocket to the second sprocket;

a device output gear formed on the final output shaft;

a final gear meshed with the device output gear; and a planetary gear set which causes the final output shaft to rotate according to the relative rotation of the second sprocket and the output gear;

wherein the gear set of the input gear and the output gear, and the gear set of the device output gear and the final gear, both comprise helical gears having a slanting tooth trace, and wherein the output gear is interposed between the second sprocket and the device output gear, and an angle made by a first line joining the input shaft and the final output shaft and a second line joining the center of the final gear and the final output shaft, is set to be less than 90 degrees, wherein moments on the final output shaft exerted by the helical gears of the gear set of the input gear and output gear and the gear set of the device output gear and the final gear, when rotating, and a bending stress in the final output shaft due to a tension of the chain act to suppress themselves among themselves.

4. An infinite speed ratio transmission device as defined in claim 3, wherein the gear set of the input gear and the output gear have tooth traces which, when a rotation is transmitted from the input gear to the output gear, exert a thrust force parallel to the final output shaft on the output gear in a direction of the second sprocket, and the gear set of the device output gear and the final gear have tooth traces which, when a rotation is transmitted from the device output gear the final gear, exert a thrust force parallel to the final output shaft on the device output gear in a direction of the second sprocket.

5. An infinite speed ratio transmission device as defined in claim 3, wherein the gear set of the input gear and the output gear have tooth traces which, when a rotation is transmitted from the input shaft to the output gear, exert a thrust force parallel to the final output shaft on the output gear in a direction opposite to the second sprocket, and the gear set of the device output gear and the final gear have tooth traces with which the final gear exerts a thrust force parallel to the final output shaft on the device output gear in the direction of the second sprocket.

6. An infinite speed ratio transmission device as defined in claim 3, wherein the gear set of the input gear and the output gear have tooth traces which, when a rotation is transmitted from the input gear to the output gear, exert a thrust force parallel to the final output shaft on the output gear in a direction opposite to the second sprocket, and the gear set of the device output gear and the final gear have tooth traces which when a rotation is transmitted from the device output gear to the final gear, exert a thrust force parallel to the final output shaft on the device output gear in a direction opposite to the second sprocket.

7. An infinite speed ratio transmission device for a vehicle comprising:

an input shaft;

a final output shaft;

a continuously variable transmission having a first sprocket and transmitting a rotation of the input shaft to the first sprocket at an arbitrary speed ratio;

a fixed speed ratio transmission comprising an output gear formed on the final output shaft and an input gear which inputs the rotation of the input shaft and which is meshed with the output gear;

a second sprocket formed on the final output shaft;

a chain which transmits the rotation of the first sprocket to the second sprocket;

a device output gear formed on the final output shaft;

a final gear meshed with the device output gear; and a planetary gear set which causes the final output shaft to rotate according to the relative rotation of the second sprocket and the output gear;

wherein either one of a gear set of the input gear and the output gear, or a gear set of the device output gear and the final gear, comprises helical gears having a slanting tooth trace, which, when rotating, exerts a moment on the final output shaft in a direction to suppress a bending stress in the final output shaft due to a tension of the chain, wherein the gear set of the input gear and the output gear, and the gear set of the device output gear and the final gear, both comprise helical gears having a slanting tooth trace, and wherein the output gear is interposed between the second sprocket and the device output gear, and an angle made by a first line joining the input shaft and the final output shaft and a second line joining the center of the final gear and the final output shaft, is set within a range from 90 degrees to 180 degrees, wherein moments on the final output shaft exerted by the helical gears of the gear set of the input gear and output gear and the gear set of the device output gear and the final gear, when rotating, and a bending stress in the final output shaft due to a tension of the chain act to suppress themselves among themselves.

8. An infinite speed ratio transmission device as defined in claim 7, wherein the gear set of the input gear and the output gear have tooth traces which, when a rotation is transmitted from the input gear to the output gear, exert a thrust force parallel to the final output shaft on the output gear in a direction of the second sprocket, and the gear set of the device output gear and the final gear have tooth traces which, when a rotation is transmitted from the device output gear to the final gear, exert a thrust force parallel to the final output shaft on the device output gear in a direction of the second sprocket.

9. An infinite speed ratio transmission device as defined in claim 7, wherein the gear set of the input gear and the output gear have tooth traces which, when a rotation is transmitted from the input gear to the output gear, exerts a thrust force parallel to the final output shaft on the output gear in a direction of the second sprocket, and the gear set of the device output gear and the final gear have tooth traces which when a rotation is transmitted from the device output gear to the final gear, exert a thrust force parallel to the final output shaft on the device output gear in a direction opposite to the second sprocket.

10. An infinite speed ratio transmission device as defined in claim 7, wherein the gear set of the input gear and the output gear have tooth traces which, when a rotation is transmitted from the input gear to the output gear, exert a thrust force parallel to the final output shaft on the output gear in a direction opposite to the second sprocket, and the gear set of the device output gear and the final gear have tooth traces which, when a rotation is transmitted from the device output gear to the final gear, exert a thrust force parallel to the final output shaft on the device output gear in a direction opposite to the second sprocket.

* * * * *